(12) United States Patent
Xiao et al.

(10) Patent No.: US 11,593,693 B2
(45) Date of Patent: Feb. 28, 2023

(54) SYSTEM AND METHOD FOR TREE-BASED MACHINE LEARNING

(71) Applicant: ROYAL BANK OF CANADA, Toronto (CA)

(72) Inventors: Chenjun Xiao, Edmonton (CA); Ruitong Huang, Edmonton (CA)

(73) Assignee: ROYAL BANK OF CANADA, Montreal (CA)

( * ) Notice: Subject to any disclaimer, the term of this patent is extended or adjusted under 35 U.S.C. 154(b) by 437 days.

(21) Appl. No.: 16/751,203

(22) Filed: Jan. 23, 2020

(65) Prior Publication Data

US 2020/0234167 A1    Jul. 23, 2020

Related U.S. Application Data

(60) Provisional application No. 62/795,970, filed on Jan. 23, 2019.

(51) Int. Cl.
*G06F 16/901* (2019.01)
*G06N 7/00* (2006.01)
(Continued)

(52) U.S. Cl.
CPC .......... *G06N 7/005* (2013.01); *G06F 16/9027* (2019.01); *G06F 17/11* (2013.01); *G06K 9/6262* (2013.01)

(58) Field of Classification Search
CPC ........ G06N 7/005; G06N 3/08; G06N 3/0454; G06N 3/006; G06N 5/003; G06F 16/9027; G06F 17/11; G06K 9/6262
(Continued)

(56) References Cited

U.S. PATENT DOCUMENTS

2011/0282602 A1* 11/2011 Hoff .................. H02S 10/00
                                                         702/60
2019/0115027 A1* 4/2019 Shah .................. G10L 17/22
(Continued)

OTHER PUBLICATIONS

Tristan Cazenave, Sequential Halving Applied to Trees, IEEE Transactions on Computational Intelligence and AI in games, IEEE Computational Intelligence Society, 2015, 7 (1), <10.1109/TCIAIG.2014.2317737>. <hal-01436255>, available at https://hal.archives-ouvertes.fr/hal-01436255.
(Continued)

*Primary Examiner* — Kuen S Lu
(74) *Attorney, Agent, or Firm* — Norton Rose Fulbright Canada LLP

(57) ABSTRACT

Systems and methods of updating a multi-level data structure for controlling an agent. The method may include: accessing a data structure defining one or more nodes. A non-leaf node of the one or more nodes may be associated with one or more edges for traversing to a subsequent node. An edge of the one or more edges may be associated with a visit count and a softmax state-action value estimation. The method may include identifying a node trajectory including a series of nodes based on an asymptotically converging sampling policy, where the node trajectory includes a root node and a leaf node of the data structure, determining a reward indication associated with the node trajectory; and for at least one non-leaf node, updating the visit count and the softmax state-action value estimate associated with one or more edges of the non-leaf node based on the determined reward indication.

17 Claims, 5 Drawing Sheets

(51) Int. Cl.
  *G06F 17/11* (2006.01)
  *G06K 9/62* (2022.01)
(58) Field of Classification Search
  USPC .......................................................... 706/12
  See application file for complete search history.

(56) References Cited

U.S. PATENT DOCUMENTS

| | | | | |
|---|---|---|---|---|
| 2020/0034701 | A1* | 1/2020 | Ritter | G06F 9/50 |
| 2020/0127457 | A1* | 4/2020 | Liu | G06N 20/00 |
| 2020/0143239 | A1* | 5/2020 | Simonyan | G06N 7/005 |
| 2021/0081804 | A1* | 3/2021 | Stojevic | G16B 40/30 |

OTHER PUBLICATIONS

Pierre-Arnaud Coquelin and Remi Munos, Bandit Algorithms for Tree Search, Uncertainty in Artificial Intelligence, 2007, pp. 67-74.

Rémi Coulom, Efficient Selectivity and Backup Operators in Monte-Carlo Tree Search, International Conference on Computers and Games, pp. 72-83, Springer, 2006.

Tuomas Haarnoja, Haoran Tang, Pieter Abbeel, and Sergey Levine, Reinforcement Learning with Deep Energy-Based Policies, Proceedings of the 34th International Conference on Machine Learning, Sydney, Australia, PMLR 70, 2017.

Tuomas Haarnoja, Aurick Zhou, Pieter Abbeel, and Sergey Levine, Soft Actor-Critic: Off-Policy Maximum Entropy Deep Reinforcement Learning with a Stochastic Actor, Proceedings of the 35th International Conference on Machine Learning, Stockholm, Sweden, PMLR 80, 2018.

Zohar Karnin, Tomer Koren, and Oren Somekh, Almost Optimal Exploration in Multi-Armed Bandits, Proceedings of the 30th International Conference on Machine Learning, Atlanta, Georgia, USA, 2013.

Michael Kearns, Yishay Mansour, and Andrew Y. Ng, A Sparse Sampling Algorithm for Near-Optimal Planning in Large Markov Decision Processes, Machine Learning, 49(2-3):193-208, 2002.

Piyush Khandelwal, Elad Liebman, Scott Niekum, and Peter Stone, On the Analysis of Complex Backup Strategies in Monte Carlo Tree Search, Proceedings of the 33rd International Conference on Machine Learning, New York, NY, USA, JMLR: W&CP vol. 48, 2016.

Levente Kocsis and Csaba Szepesvari, Bandit based Monte-Carlo Planning, European Conference on Machine Learning, pp. 282-293, Springer, 2006.

Tor Lattimore and Csaba Szepesvari, Bandit Algorithms, 2018— Available at: https://tor-lattimore.com/downloads/book/book.pdf (last accessed Mar. 31, 2020).

Ofir Nachum, Mohammad Norouzi, Kelvin Xu, and Dale Schuurmans, Bridging the Gap Between Value and Policy Based Reinforcement Learning, Advances in Neural Information Processing Systems, pp. 2775-2785, 2017.

David Silver et al., Mastering the game of Go with deep neural networks and tree search, Nature, vol. 529, pp. 484-503, Jan. 2016.

David Silver et al., Mastering the game of Go without human knowledge, Nature, vol. 550, pp. 354-371, Oct. 2017.

Stephen J.J. Smith and Dana S. Nau, An Analysis of Forward Pruning, AAAI-94 Proceedings, pp. 1386-1391, 1994.

Richard S. Sutton and Andrew G. Barto, Introduction to Reinforcement Learning, MIT press Cambridge, 2018, available at http://incompleteideas.net/book/RLbook2018.pdf.

David Tolpin and Solomon Eyal Shimony, MCTS Based on Simple Regret, Proceedings of the Fifth Annual Symposium on Combinatorial Search, pp. 193-199, 2012.

Chenjun Xiao, Jincheng Mei, and Martin Muller, Memory-Augmented Monte Carlo Tree Search, Thirty-Second AAAI Conference on Artificial Intelligence, pp. 1-7, 2018.

* cited by examiner

SYSTEM AND METHOD FOR TREE-BASED MACHINE LEARNING

CROSS REFERENCE TO RELATED APPLICATIONS

This application claims priority from U.S. provisional patent application No. 62/795,970, filed on Jan. 23, 2019, the entire contents of which are hereby incorporated by reference herein.

FIELD

Embodiments of the present disclosure generally relate to the field of machine learning, and in particular to systems and methods of controlling a machine learning agent.

BACKGROUND

Reinforcement learning is associated with decision making or action selection. An agent may conduct actions in an environment and may receive observations or feedback form the environment, including a reward indicator and/or new state information. The agent may utilize the reward indicator to evaluate the taken action and to determine how best to subsequently make action selections in the environment.

SUMMARY

In one aspect, the present application may provide a method of updating a multi-level data structure for controlling an agent. The method may include: accessing a data structure defining one or more nodes, wherein a non-leaf node of the one or more nodes is associated with one or more edges for traversing to a subsequent node, and wherein an edge of the one or more edges is associated with a visit count and a softmax state-action value estimation; for each of a plurality of rounds, identifying a node trajectory including a series of nodes based on an asymptotically converging sampling policy, wherein the node trajectory includes a root node and a leaf node of the data structure; determining a reward indication associated with the node trajectory; and for at least one non-leaf node in the node trajectory, updating the visit count and the softmax state-action value estimate associated with one or more edges of the non-leaf node based on the determined reward indication associated with the node trajectory In another aspect, the present application may provide a system for updating a multi-level data structure for controlling an agent. The system may include a processor; and a memory coupled to the processor. The processor may store processor-executable instructions that, when executed, configure the processor to: access a data structure defining one or more nodes, wherein a non-leaf node of the one or more nodes is associated with one or more edges for traversing to a subsequent node, and wherein an edge of the one or more edges is associated with a visit count and a softmax state-action value estimation; for each of a plurality of rounds, identify a node trajectory including a series of nodes based on an asymptotically converging sampling policy, wherein the node trajectory includes a root node and a leaf node of the data structure; determine a reward indication associated with the node trajectory; and for at least one non-leaf node in the node trajectory, update the visit count and the softmax state-action value estimate associated with one or more edges of the non-leaf node based on the determined reward indication associated with the node trajectory.

In another aspect, the present application may provide a non-transitory computer-readable medium or media having stored thereon machine interpretable instructions which, when executed by a processor, cause the processor to perform a computer implemented method of updating a multi-level data structure for controlling an agent, the method including: accessing a data structure defining one or more nodes, wherein a non-leaf node of the one or more nodes is associated with one or more edges for traversing to a subsequent node, and wherein an edge of the one or more edges is associated with a visit count and a softmax state-action value estimation; for each of a plurality of rounds, identifying a node trajectory including a series of nodes based on an asymptotically converging sampling policy, wherein the node trajectory includes a root node and a leaf node of the data structure; determining a reward indication associated with the node trajectory; and for at least one non-leaf node in the node trajectory, updating the visit count and the softmax state-action value estimate associated with one or more edges of the non-leaf node based on the determined reward indication associated with the node trajectory.

In another aspect, the present application may provide a multi-level data structure for controlling an agent comprising a plurality of nodes including a non-leaf node associated with one or more edges for traversing to a subsequent node, wherein an edge of the one or more edges is associated with a visit count and a softmax state-action value estimation, wherein the multi-level data structure was updated by a method comprising: accessing the data structure; for each of a plurality of rounds, identifying a node trajectory including a series of nodes based on an asymptotically converging sampling policy, wherein the node trajectory includes a root node and a leaf node of the data structure; determining a reward indication associated with the node trajectory; and for at least one non-leaf node in the node trajectory, updating the visit count and the softmax state-action value estimate associated with one or more edges of the non-leaf node based on the determined reward indication associated with the node trajectory.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
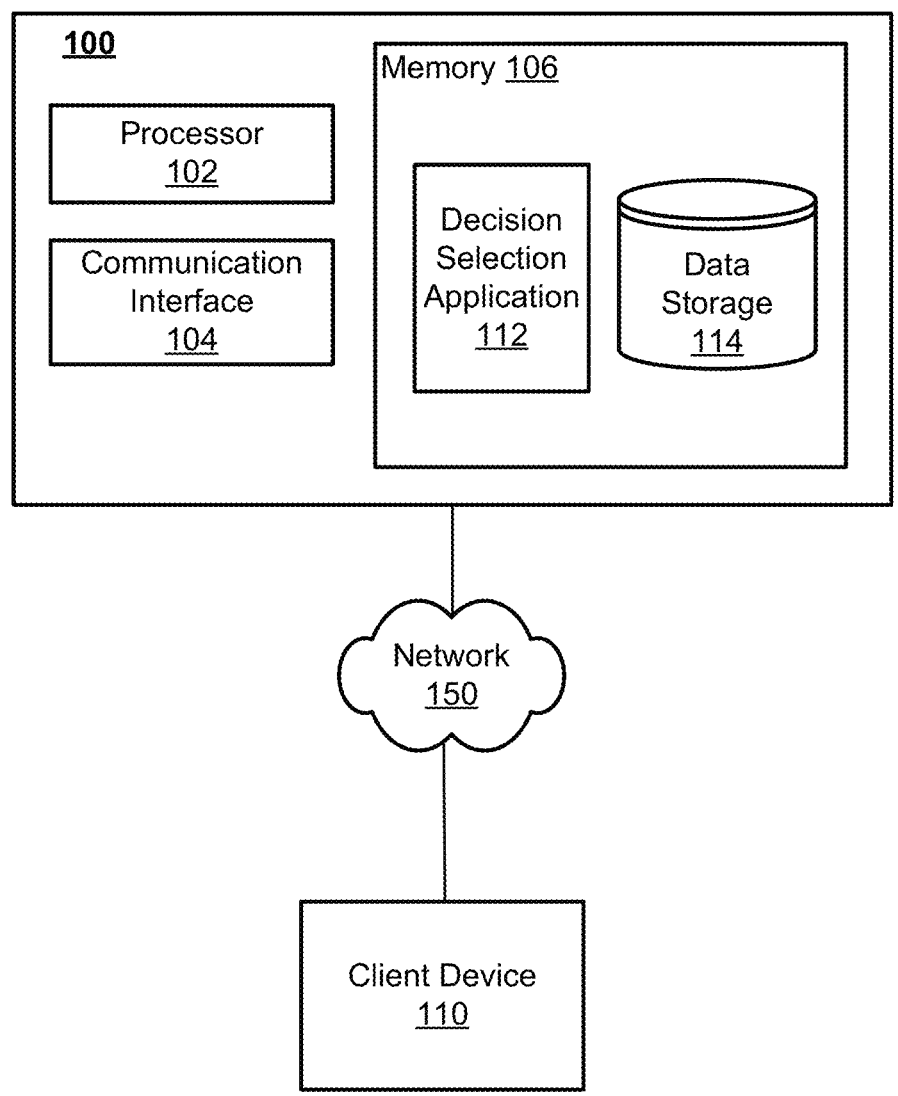
FIG. 1 illustrates a system, in accordance with an embodiment of the present application.

Multi-level data structures may be configured for sequential decision making or selection problems. In some examples, Monte Carlo planning processes, such as the Monte Carlo Tree Search (MCTS) process, may be configured for controlling a computing device to conduct sequential decision operations. The Monte Carlo Tree Search process includes conducting a search tree of states that may be evaluated by averaging over outcomes based on simulations. MCTS operations may configure a computing device to simulate state-action trajectories using domain generative models, and to build a search tree based on incrementally gathered data during simulations conducted by the computing device. In some embodiments, the search tree may be combined with domain knowledge, such as function approximations based on online [17] or offline [12, 13] data. MCTS operations may be selective, where a bandit algorithm may be applied for balancing between exploring uncertain search tree branches and exploiting known/promising search tree branches [9]. In some examples, MCTS operations may converge to an optimal bandit algorithm policy when exploitation and exploration may be balanced [9,7].

MCTS operations may be reliant on state value estimations. At individual nodes of the search tree, the value estimation may be used to calculate a value of an action leading to that node. The convergence rate of the state value estimation may influence the convergence rate for states further up in the search tree.

In some scenarios, Monte Carlo value estimates (e.g., average over simulation outcomes) may not result in convergence when a value is back-propagated in the search tree. For a given search tree node, the sampling policy a subtree may change and payoff sequences may drift over time. Compounding error based at least on the search tree data structure and/or uncertainty of operations relating to Monte Carlo estimation may result in operations exhibiting a polynomial convergence rate for selecting a preferred action at a root node of the search tree. Systems and methods to more efficiently conduct decision making or selections based on the multi-level data structure may be desirable.

As non-limiting illustrative examples, embodiments of the present application may relate to reinforcement learning systems, where an agent (e.g., learner) and an environment may sequentially interact. A multi-level data structure, such as a tree data structure, may include a plurality of nodes representing states. One or more nodes may be associated with one or more edges (e.g., associated with an action) to traverse to a subsequent node. In each round of interaction, the agent may select an action and the environment may sample a reward for revelation to the agent. With each round, statistics associated with the one or more edges may be updated such that selection of an action during a subsequent round may be based on the statistics associated with the one or more edges.

In another non-illustrative example, a round may be associated with a simulation of a trajectory of nodes from a root node to a leaf node of the tree data structure. It may be desirable to provide systems and methods of updating multi-level data structures storing statistics for identifying an optimal sequence of actions from a root node in a sequential decision making or selection application.

For example, embodiments of the present application may be implemented in data center cooling control systems for identifying cooling requirements at the respective data center regions. In some examples, embodiments of the present application may be used for order execution, portfolio optimization, option pricing, or the like in the capital markets of the financial industry. Further, embodiments of the present application may be used in the health care decision making for patient-specific treatment decisions or selection of adaptive treatment strategies. In some examples, embodiments of the present application may include selection making processes associated with electricity or utility service delivery. In some examples, embodiments of the present application may be used for decision making processes during execution of games, such as Go, Atari-based games, or the like. In some embodiments, features of decision making or selection operations may be used for determining transportation scheduling decisions for minimizing passenger wait times or delays. Other example applications of embodiment features described herein may be contemplated.

Systems and methods described in the present application may provide operations for updating a multi-level data structure for controlling an agent, such as a computing device or decision making operations. The operations for updating a multi-level data structure may include softmax value estimate in MCTS based on a maximum entropy policy optimization framework.

For example, features of embodiments described in the present application may include operations of a stochastic softmax bandit framework for single-step decision problems, where softmax values may be sequentially estimated at an optimal convergence rate in terms of mean squared error. Further, features of embodiments described in the present application may include back-propagating softmax state values in a multi-level data structure, leading to an increased convergence rate of finding an optimal or more desirable/beneficial action associated with a root node of the multi-level data structure. In some examples, the convergence rate associated with embodiments of the present application may be exponential, in comparison to a polynomial convergence rate of other methods and operations.

Reference is made to FIG. 1, which illustrates a system 100 for controlling an agent, in accordance with an embodiment of the present application. The system 100 may transmit and/or receive data messages to/from a client device 110 via a network 150. The network 150 may include a wired or wireless wide area network (WAN), local area network (LAN), a combination thereof, or the like.

The system 100 includes a processor 102 configured to implement processor readable instructions that, when executed, configure the processor 102 to conduct operations described herein. For example, the system 100 may be configured to conduct operations for generating and/or updating a multi-level data structure. In some embodiments, the multi-level data structure may be a data tree structure associated with operations of a Monte Carlo Tree search, or other types of data structure searches.

In some embodiments, the system 100 may be configured to conduct operations for updating the multi-level data structure for controlling an agent. In some embodiments, the agent may be the client device 110. In some other embodiments, the agent may be at the system 100. In some embodiments, the agent may be associated with operations for decision making or selection conducted at the system 100. Other operations of the system 100 may be contemplated.

The system 100 may include a communication interface 104 to communicate with other computing devices, to access or connect to network resources, or to perform other computing applications by connecting to a network (or multiple networks) capable of carrying data. In some embodiments, the network 150 may include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others, including combination of these. In some examples, the communication interface 104 may include one or more busses, interconnects, wires, circuits, and/or any other connection and/or control circuit, or combination thereof. The communication interface 104 may provide an interface for communicating data between components of a single device or circuit.

The system may include memory 106. The memory 106 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 106 may store a decision selection application 112 including processor readable instructions for conducting operations described herein. In some examples, the decision selection application 112 may include operations for updating a multi-level data structure for controlling an agent. Other operations of the decision selection application 112 may be contemplated.

The system 100 may include a data storage 114. In some embodiments, the data storage 114 may be a secure data store. In some embodiments, the data storage 114 may store multi-level data structures, data structure state values, decision/selection simulation outcome data, softmax state-action values, or other types of data.

The client device 110 may be a computing device including a processor, memory, and a communication interface. In some embodiments, the client device 110 may be a computing device associated with a local area network. The client device 110 may be connected to the local area network and may transmit one or more data sets to the system 100. For example, the client device 110 may transmit data or receive data from the system 100, and the system 100 may be configured to conduct operations to update multi-level data structures for controlling the client device 110 operations. Other operations may be contemplated.

In some embodiments, sequential decision making or selection may be based on Markov Decision processes. A Markov Decision Process may be defined as a 5-tuple $\{\mathcal{S},\mathcal{A},P,R,H\}$, where $\mathcal{S}$ may be the state space, $\mathcal{A}$ may be the action space. Further, H may be the maximum number of steps at each episode, and P and R may be the transition and reward functions, such that $P(\cdot|s, a)$ and $R(s, a)$ give the next state distribution and reward of taking action a at state s. In some embodiments, transition and reward operations may be deterministic. Example operations may include stochastic transitions and/or rewards, and may include dependencies on variances of transition and/or reward distributions. In some examples, a solution of a Markov Decision Process may be based on a policy $\pi$ that maps a state s to a probability distribution over actions. An optimal policy may maximize, on expectation, the cumulative sum of rewards, which may be defined as:

$$G_t = \sum_{k=0}^{H+1} R_{t+k}, R_t = \begin{cases} R(s_t, a_t), & t \leq H \\ v(s_{H+1}), & t = H + 1 \end{cases}$$

In the above, an oracle function v may assign stochastic evaluations for states at the end of episode. In some examples, the above described definition may be a general formulation for planning algorithms in infinite horizon Markov Decision Processes, as H can be considered as the maximum search depth and a stochastic evaluation function may be applied. In some examples, v may be subgaussian and has variance $\sigma^2$.

For policy $\pi$, the state value function $V^\pi(s)$ may be defined to be the expected sum of rewards from s as $V^\pi(s) = \mathbb{E}^\pi[G_t|s_t=s]$. The state-action value function, also known as the Q-value, may be defined as $Q^\pi(s, a) = \mathbb{E}^\pi[G_t|s_t=s, a_t=a]$. The optimal value functions may be the maximum value achievable by any policy, $V^*(s)=\max_\pi V^\pi(s)$, $Q^*(s, a)=\max_\pi Q^\pi(s, a)$. The optimal policy may be defined by the greedy policy with respect to $Q^*$, $\pi^*(s)=\text{argmax}_a Q^*(s, a)$. In some embodiments, optimal values may be recursively defined by the Bellman optimality equation, $$Q^*(s, a) = R(s, a) + \mathbb{E}_{s'|s,a}[V^*(s')], V^*(s) = \max_a Q^*(s, a).$$

The present application may describe systems and methods directed to online planning problems that may utilize a generative model of the Markov Decision Process to compute an optimal policy at a given input state, given a fixed sampling budget. The generative model may be a randomized algorithm that may provide as output a reward $R(s, a)$ and may sample a next state s' from $P(\cdot|s, a)$, given a state-action pair (s, a) as the input. For example, in the game of Go, if the rules of the game are known, the next board state may be predicted after a move. To solve the online planning problem, decision making or selection operations may utilize the generative model to sample an episode at each round and propose an action for the input state after the sampling budget is expended. The performance of an online planning algorithm may be measured by its probability of proposing the optimal action for the state of interest.

In some embodiments, the system 100 may conduct operations associated with a Monte Carlo Tree Search (MCTS). MCTS may incrementally generate a look-ahead tree $\mathcal{T}$ online and may evaluate states based on Monte Carlo simulations [3]. Each node in $\mathcal{T}$ may be labeled by a state s and may store a value estimate Q(s, a) and visit count N(s, a) for each action a. The estimate Q(s, a) may be the mean return of all simulations starting from s and a. The root of $\mathcal{T}$ may be labeled by the state of interest.

At each iteration of operations including the MCTS operations, one simulation starts from the root of the search tree and may proceed in two stages: a tree policy may be used to select actions while within the tree until a leaf of $\mathcal{T}$ is reached. An evaluation function may be conducted at the leaf to obtain a simulation return. In some embodiments, typical choices of the evaluation function may include function approximation with a neural network, and Monte Carlo simulations using a roll-out policy. The return may be propagated upwards to all nodes along the path to the root. $\mathcal{T}$ may be expanded by expanding the leaf reached during the simulation.

The system 100 may conduct operations of Bandit algorithms to balance between exploring uncertain tree structure branches and exploiting promising tree structure branches. Operations of upper confidence bounds applied to trees (UCT) may apply UCB1 as its tree policy to balance expansion of the search tree [9]. At each node of $\mathcal{T}$, a tree policy may select an action with the maximum upper confidence bound $$UCB(s, a) = Q(s, a) + c\sqrt{\frac{\log N(s)}{N(s, a)}},$$

where $N(s)=\Sigma_a N(s, a)$, and c is a parameter controlling exploration. The UCT algorithm may be desirable in example practical problems. For example, the above described operations may be used for conducting operations associated with AlphaGo [12, 13]. UCT may be asymptotically optimal: the value estimated by UCT may converge in probability to the optimal value, $$Q(s, a) \xrightarrow{P} Q^*(s, a), \forall s \in \mathcal{S}, \forall a \in \mathcal{A}.$$

The probability of finding a suboptimal action at the root converges to zero at a rate of $$o\left(\frac{1}{t}\right),$$

where t may be the simulation budget [9].

In some embodiments, the system 100 may conduct operations associated with maximum entropy policy optimization, which may augment standard expected reward objectives of an entropy regularizer. Given K actions and the corresponding K-dimensional reward vector $r \in \mathbb{R}^K$, the entropy regularized policy optimization problem may identify a policy by solving $$\max_\pi \{\pi \cdot r + \tau \mathcal{H}(\pi)\}$$

where $\tau \geq 0$ is a user-specified temperature parameter controlling a degree of exploration. The above-described optimization problem may be a closed form solution. In some embodiments, the softmax $\mathcal{F}_\tau$ and the soft indmax $f_\tau$ functions may be:

$$f_\tau(r)=\exp\{(r-\mathcal{F}_\tau(r))/\tau\} \quad \mathcal{F}_\tau(r)=\tau \log \Sigma_a \exp(r(a)/\tau)$$

In some embodiments, the softmax $\mathcal{F}_\tau$ outputs a scalar while the soft indmax $f_\tau$ maps a reward vector r to a Boltzmann policy. $\mathcal{F}_\tau(r)$, $f_\tau(r)$ and $$\mathcal{F}_\tau(r) = \max_\pi \{\pi \cdot r + \tau \mathcal{H}(\pi)\} = f_\tau(r) \cdot r + \tau \mathcal{H}(f_\tau(r)).$$

The above relation may suggest that the softmax value is an upper bound on the maximum value, and a gap may be upper bounded by the product of $\tau$ and the maximum entropy. As $\tau \to 0$, the entropy regularized policy optimization problem described above may approach the standard expected reward objective, where the optimal solution may be the hard-max policy. The entropy regularized optimization may be used to define the softmax value functions by replacing the hard-max operator in with the softmax operators [4, 11], $$Q_{sft}^*(s,a)=R(s,a)+\mathbb{E}_{s'\sim s,a}[V_{sft}^*(s')], V_{sft}^*(s)=\tau \log \Sigma_a \exp\{Q_{sft}^*(s,a)/\tau\}.$$

In some embodiments, an optimal softmax policy may be characterized by:

$$\pi_{sft}^*(a|s)=\exp\{(Q_{sft}^*(s,a)-V_{sft}^*(s))/\tau\}.$$

Embodiments of the present application may include operations to combine the maximum entropy policy optimization framework with MCTS by estimating softmax values back propagated from simulations. In some scenarios, softmax values may be backpropagated in a search tree, and providing an increased convergence rate to the optimal policy at a root node.

Embodiments of the present application include systems and methods associated with a stochastic softmax bandit problem, a bandit algorithm associated with the stochastic softmax bandit problem, and operations to identify a tight upper bound on convergence rate. The upper bound may match the lower bound in order and in coefficient of a dominating term.

In some embodiments, a reinforcement learning system may include an agent (or a learner) and an environment. A stochastic bandit setting may include arms set $\mathcal{A}$. At each round t, an agent or learner may choose an action $A_t \in \mathcal{A}$. An environment may sample a random reward $R_t$ and may reveals it to the learner. Let r(a) be the expected value of the reward distribution of action $a \in \mathcal{A}$. In some examples, $r(a) \in [0,1]$, and that all reward distributions may be $\sigma^2$-subgaussian.

In some examples, the probability space carries the tuple of random variables $S_T=\{A_0, R_0, \ldots, A_T, R_T\}$. For every time step t-1 the historical observation may defines a $\sigma$-algebra $\mathcal{F}_{t-1}$ and $A_t$ is $\mathcal{F}_{t-1}$-measurable, the conditional distribution of $A_t$ is our policy at time $\pi_t$, and the conditional distribution of the reward $R_{A_t}-r(A_t)$ is a martingale difference sequence.

For round t, $N_t(a)$ may be defined as the number of times a is chosen so far, and $\hat{r}_t(a)$ may be defined as the empirical estimate of r(a), $$N_t(a)=\Sigma_{i=1}^t \mathbb{I}\{A_t=a\} \hat{r}_t(a)=\Sigma_{i=1}^t \mathbb{I}\{A_t=a\} R_t/N_t(a),$$

where $\mathbb{I}\{\cdot\}$ may be the indicator function. Let $r \in [0,1]^K$ be the vector of expected rewards, and $\hat{r}_t$ be the empirical estimates of r at round t. $\pi_{sft}^* = f_\tau(r)$ may be denoted as the optimal soft indmax policy defined by the mean reward vector r. The stochastic bandit setting may be considered as a special case of an episodic MDP with H=1.

Theorem 1:

In a stochastic softmax bandit problem, instead of finding the policy with maximum expected reward as in original stochastic bandits [10], embodiments of the present application may estimate the softmax value $V_{sft}^* = \mathcal{F}_\tau(r)$ for some $\tau > 0$. Operations may define $U^* = \Sigma_a \exp\{r(a)/\tau\}$ and $U_t = \Sigma_a \exp\{\hat{r}_t(a)/\tau\}$, and may propose to use the estimator $V_t = \mathcal{F}_\tau(\hat{r}_t) = \tau \log U_t$. In some embodiments, the goal is to find a sequential sampling algorithm that can minimize the mean squared error, $\mathcal{E}_t = \mathbb{E}[(U^* - U_t)^2]$. The randomness in $\mathcal{E}_t$ may be associated with both the sampling algorithm and the observed rewards. Our first result gives a lower bound on $\mathcal{E}_t$.

In some embodiments, in the stochastic softmax bandit problem, for any algorithm that achieves $$\varepsilon_t = O\left(\frac{1}{t}\right),$$

there exists a problem setting such that $$\lim_{t\to\infty} t\varepsilon_t \geq \frac{\sigma^2}{\tau^2}(\Sigma_a \exp(r(a)/\tau))^2.$$

To achieve the lower bound, there must be for any $a \in \mathcal{A}$, $\lim_{t\to\infty} N_t(a)/t = \pi_{sft}/(a)$. In the above, $$\varepsilon_t = O\left(\frac{1}{t}\right)$$

is presumed, but not that the algorithm achieves (asymptotically) unbiased estimates for each arm. The lower bound may also reflect the consistency between the softmax value and the soft indmax policy. To achieve the lower bound on the mean squared error, the sampling policy may converge to $\pi_{sft}^*$ asymptotically.

In some embodiments, systems and methods may include operations of Empirical Exponential Weight (E2W) (or alternately Regression-based Exponential Weight (REW) operations) for the stochastic softmax bandit problem described herein. In some embodiments, operations may enforce exploration to guarantee good estimation of $\hat{r}$, and make the policy converge to $\pi^*$ asymptotically, as suggested by the lower bound. In some embodiments, the lower bound may be a mean squared error lower bound.

As a non-limiting illustrating example, pseudocode for operations of Empirical Exponential Weight (or alternately Regression-based Exponential Weight) may include:

1:    $\forall a, \hat{r}(a) = 0, N(a) = 0$
2:    for t = 1, 2, ... do
3:        $\lambda_t = \ldots$ (TODO)
4:        $\forall a, \hat{\pi}_t(a) = f_\tau(\hat{r})(a)$
5:    
$$\forall a, \pi_t(a) = (1 - \lambda_t)\hat{\pi}(a) + \lambda_t \frac{1}{K}$$

6:    Draw action $A_t$ by sampling from $\pi_t$ and play it.
7:    Observe $R_t$ from the environment.
8:    $N(A_t) = N(A_t) + 1$
9:    
$$\hat{r}_t(A_t) = \hat{r}_t(A_t) + \frac{R_t - \hat{r}_t(A_t)}{N(A_t)}$$

10:   end for

In some embodiments, at round t, the algorithm may select an action by sampling from the distribution:

$$\pi_t(a) = (1 - \lambda_t)f_\tau(\hat{r})(a) + \lambda_t \frac{1}{|\mathcal{A}|},$$

where $\lambda_t = \varepsilon|\mathcal{A}|/\log(t+1)$ is a decay rate for exploration, with exploration parameter $\varepsilon > 0$. Our next theorem provides an exact convergence rate for E2 W.

Theorem 2:

For the softmax stochastic bandit problem, E2 W may provide:

$$\lim_{t\to\infty} t\varepsilon_t = \frac{\sigma^2}{\tau^2}(\Sigma_a \exp(r(a)/\tau))^2.$$

Theorem 2 illustrates that E2 W may be an asymptotically optimal sequential sampling strategy for estimating the softmax value in stochastic multi-armed bandits. Softmax bandits may be used for estimating each state's softmax value and balancing expansion or growth of a search tree.

Maximum Entropy MCTS:

In some embodiments of the present application, systems and methods may conduct operations including a combination of a maximum entropy policy optimization with Monte Carlo Tree Search operations. The operations may be referred to herein as a Maximum Entropy for Tree Search (MENTS). MENTS may include operations of Empirical Exponential Weight (E2W) described herein as a tree policy and may include operations for evaluating search nodes based on softmax values back-propagated from simulations.

In some embodiments, let $\mathcal{T}$ be a generated look-ahead search tree. Each node $n(s) \in \mathcal{T}$ may be labeled by a state s, and may contain a softmax value estimate $Q_{sft}(s, a)$ and a visit count $N(s, a)$ for each action a. $Q_{sft}(s)$ may denote a $|\mathcal{A}|$-dimensional vector with components $Q_{sft}(s, a)$. Let $N(s) = \Sigma_a N(s, a)$ and $V_{sft}(s) = \mathcal{F}_\tau(Q_{sft}(s))$. During an in-tree phase of a simulation, the tree policy may select an action based on:

$$\pi_t(a \mid s) = (1 - \lambda_s)f_\tau(Q_{sft}(s))(a) + \lambda_s \frac{1}{|\mathcal{A}|}$$

where $\lambda_s = \varepsilon|\mathcal{A}|/\log(\Sigma_a N(s, a)+1)$.

In some embodiments, let $\{s_0, a_0, s_1, a_1, \ldots, s_T\}$ be the state action trajectory in the simulation, where $n(s_T)$ is a leaf node of $\mathcal{T}$. Operations of an evaluation function may be called on $s_T$ and may return an estimate R. In some examples, $R_t$ may be replaced by a sample from an evaluation function, and a martingale assumption may be extended to the selection policy and the evaluation function on leaves.

In some embodiments, $\mathcal{T}$ may be expanded by expanding $n(s_T)$. Statistics may initialized by $Q_{sft}(s_T, a)=0$ and $N(s_T, a)=0$ for all actions a. For all nodes in the trajectory, the visiting counts may be updated by $N(s_t, a_t)=N(s_t, a_t)+1$, and the Q-values may be updated using a softmax backup, $$Q_{sft}(s_t, a_t) = \begin{cases} r(s_t, a_t) + R & t = T-1 \\ r(s_t, a_t) + \mathcal{F}_\tau(Q_{sft}(s_{t+1})) & t < T-1 \end{cases}$$

In some embodiments, operations associated with MENTS may be extended to utilize domain knowledge, such as function approximations learned offline. For example, suppose that a policy network $\tilde{\pi}(\cdot|s)$ is available. Then the statistics may be initialized by $Q_{sft}(s_T, a)=\log \tilde{\pi}(a|s_T)$ and $N(s_T, a)=0$ for all actions a during the expansion. Finally, at each time step t, MENTS proposes the action with the maximum estimated softmax value at the root $s_0$; i.e. $a_t = \text{argmax}_a Q_{sft}(s_0, a)$.

To illustrate features of embodiments of the present application, in some examples, a method may include operations of a max search problem in a tree $\mathcal{T}$ with branching factor (action) K of depth D. Let $\mathcal{L} \subset \mathcal{T}$ be the set of the leaves of the tree. For a leaf node s, a stochastic value function may be assigned. In some examples, the stochastic value may have subgaussian error. The value of s may be the expectation of the stochastic value function. The operations of the max search problem may be for identifying a path from a root node to the optimal leaf (a leaf with a largest value) as quickly as possible. In some examples, the max search problem may be a model for one or more planning algorithms, where K may be the number of actions, D may be the maximum search depth, and a stochastic value estimation may be applied.

Embodiment methods of the present application may be called a Regression-based Exponential Weight for Tree (REWT). In some embodiments, methods described herein may utilize operations of a regression-based exponential weight (REW) method for in-tree selection and may conduct operations to apply softmax function for state value evaluations.

In the present example, a node s in the search tree may correspond to a specific node $\xi(s) \in \mathcal{T}$. Each node s in the search tree, where $\xi(s) \in \mathcal{L}$, may maintain two statistics $\{N(s), \hat{V}(s)\}$, where $N(s)$ may be a visit count and $\hat{V}(s)$ may be a mean state value.

A node s that $\xi(s) \in \mathcal{T} \setminus \mathcal{L}$ may contain edges (s, a) for all actions $a \in \mathcal{A}(s)$ and may store a set of statistics, including a softmax state value estimation $\hat{V}_{sft}(s)$. In some embodiments, for each edge $\{N(s, a), \hat{Q}_{sft}(s, a)\}$, $N(s,a)$ may be the visit count and $Q_{sft}^*(s, a)$ may be the softmax state-action value estimation.

In some embodiments, operations of REWT may include iterations of 4 operations, including a select operation, an evaluate operation, an expand operation, and a backup operation.

At the select operation, the method may include generating a trajectory of nodes based on the REW method. Generating the trajectory of nodes may include a series of nodes including a root node of the search tree, $s_0$, and ending with a leaf node, $s_L$, of the search tree. In some embodiments, a probability of selecting an action a at node s may be defined by:

$$\pi(a \mid s) = (1 - \lambda_s) \frac{\exp(\hat{Q}_{sft}(s, a)/\tau)}{\Sigma_b \exp(\hat{Q}_{sft}(s, b)/\tau)} + \lambda_s \frac{1}{K}$$

where the discount factor $\lambda_s$ may be defined based on $N(s) = \Sigma_a N(s, a)$.

At the evaluate operation, an evaluation function may be used to generate a value estimation for $s_L$. In an example of the Monte Carlo evaluation, the method may simulate a sequence of nodes from $s_L$ to a leaf node of the tree and may utilize a stochastic value function to observe a return R.

At the expand operation, if $\xi(s_L) \in \mathcal{T} \setminus \mathcal{L}$, the node $s_L$ may be expanded by adding one or more children to the search tree. The statistics stored in $s_L$ may be initialized by:

$\hat{V}_{sft}(s_L) \leftarrow \exp(R/\tau)$ $\forall a \in \mathcal{A}(s_L) N(s_L, a), \hat{Q}(s_L, a) \leftarrow 0$ When $\xi(s_L) \in \mathcal{T}$, the method may initialize $N(s_L)$ and $\hat{V}(s_L)$ by 0.

At the backup operation, if $\xi(s_L) \in \mathcal{L}$, the method may update node statistics as follows:

$$N(s_L) \leftarrow |N(s_L) + 1$$

$$\hat{V}(s_L) \leftarrow \hat{V}(s_L) + \frac{R - \hat{V}(s_L)}{N(s_L)}$$

In some examples, the edge statistics may be updated in a backward pass at each step $t \leq L-1$, as follows:

$\hat{Q}_{sft}(s_t, a_t) \leftarrow \hat{V}_{sft}(s_{t+1})$ $\hat{V}_{sft}(s_t) \leftarrow \mathcal{F}(\hat{Q}_{sft}(s_t))$ $N(s_t, a_t) \leftarrow N(s_t, a_t) + 1$ where $\hat{Q}_{sft}(s_t)$ is a K dimensional vector, and each component of which is $\hat{Q}_{sft}(s_t, a)$ for action a. As an non-limiting illustrating example, pseudocode for operations of REWT may include:

```
1:   for t = 1, 2, . . . do
2:       Select a trajectory of nodes {s0, a0, . . . sL-1, sL}.
3:       Evaluate at sL and observe R.
4:       if ξ(sL) ∈ T \ L then
5:           Expand sL and initialize according to (5)
6:       end if
7:       Backup according to (6) and (7)
8:   end for
```

As in operations associated with UCT, respective iterations of operations of REWT may expand one node and add children to the current search tree.

In another embodiment of generating a tree, the select operation and the expand operation may differ. For example, instead of finishing when a leaf node of the current search tree is reached, the method may expand the leaf and initialize statistics as follows:

$\hat{V}_{sft}(s_L) \leftarrow \exp(R/\tau)$ $\forall a \in \mathcal{A}(s_L) N(s_L, a), \hat{Q}_{sft}(s_L, a) \leftarrow 0.$ Further, in the present embodiment, the method may include selecting actions to take until a node s is identified, where $\xi(s) \in \mathcal{L}$. The method may include utilizing the stochastic value function at a node s and a result of the stochastic value function may be used to update the search tree as in the above-described in the backup operation. In the present example, because each iteration may add a separate path of nodes from the root to the leaf of $\mathcal{T}$ to the current search tree, the present example may be called a path-REWT.

To illustrate a theoretical analysis of convergence property for operations associated with MENTS, for any node in a search tree, after its subtree has been explored, the estimated softmax value may converge to an optimal value at an exponential rate. Recall that in Theorem 1, an optimal sampling algorithm for the softmax stochastic bandit problem may guarantee $\lim_{t \to \infty} N_t(a)/t = \pi_{sft}^*(a)$ for any action a. This may be shown in E2 W with high probability and may be based on the proof of Theorem 2.

Theorem 3:

E2 W may be applied to the stochastic softmax bandit problem. Let $N_t^*(a) = \pi_{sft}^*(a) \cdot t$. Then there exists some constants C and $\tilde{C}$ such that, $$\mathbb{P}\left(|N_t(a) - N_t^*(a)| > \frac{Ct}{\log t}\right) \leq \tilde{C}|\mathcal{A}|t\exp\left\{-\frac{t}{(\log t)^3}\right\}.$$

In an example of the bandit case, reward distribution of each arm may be assumed to be subgaussian. When applying bandit algorithms at internal nodes of a search tree, the payoff sequence experienced from each action may drift over time, as the sampling probability of the actions in the subtree may be changing. In embodiments described herein, even under such example drift over time conditions, a softmax value may be efficiently estimated according to back-propagation operations, where Q-values may use a softmax backup (as described above).

Theorem 4:

For any node $n(s) \in \mathcal{T}$, define the event:

$$E_s = \left\{\forall a \in \mathcal{A}, |N(s, a) - N^*(s, a)| < \frac{N^*(s, a)}{2}\right\}$$

where $N^*(s, a) = \pi_{sft}^*(a|s) \cdot N(s)$. For $\epsilon \in [0,1)$, there exist some constant C and $\tilde{C}$ such that for sufficiently large t, $$\mathbb{P}\left(|V_{sft}(s) - V_{sft}^*| \geq \epsilon \mid E_s\right) \leq \tilde{C}\exp\left\{-\frac{N(s)\tau^2\epsilon^2}{C\sigma^2}\right\}.$$

Without loss of generality, $Q^*(s, 1) \geq Q^*(s, 2) \geq \ldots \geq Q^*(s, |\mathcal{A}|)$ may be assumed for any $n(s) \in \mathcal{T}$, and define $\Delta = Q^*(s, 1) - Q^*(s, 2)$. As described in some embodiments of the present application, the gap between the softmax and maximum value is upper bounded by $\tau$ times the maximum of entropy. As long as $\tau$ is chosen small enough such that this gap is smaller than $\Delta$, the best action may also have the largest softmax value. To illustrate the probability that the above-described operations (or algorithm) fail to find the optimal arm at the root, Theorem 5 is provided.

Theorem 5:

Let $a_t$ be the action returned by MENTS at iteration t. Then for large enough t with some constant C, $$\mathbb{P}(a_t \neq a^*) \leq Ct\exp\left\{-\frac{t}{(\log t)^3}\right\}.$$

In some embodiments, operations associated with MENTS may provide faster convergence rate than operations associated with UCT. For example, MENTS may apply operations associated with E2 W (as described herein) as a tree policy during simulations. The softmax value functions used in MENTS may be estimated in an optimal rate and the tree policy may converge to the optimal softmax policy $\pi_{sft}^*$ asymptotically, as suggested by Theorem 1 and/or Theorem 2 described herein. Further, Theorem 4 may illustrate that the softmax value may be efficiently back-propagated in the search tree. Accordingly, the probability of MENTS failing to identify the best decision at the root may decay exponentially, thereby improving upon the polynomial rate of decay of operations associated with UCT.

In some embodiments described herein, a maximum entropy formulation may provide improvements in exploration and robustness based on adapting a smoothed optimization objective and acquiring diverse policy behaviour. Embodiments of systems and methods described herein directed to the MENTS operations may be associated with the softmax Bellman operator, which may be used as the value propagation formula in MCTS. It may be appreciated that operations associated with UCT may take a long time to discover an optimal branch that initially may look undesirable.

In some examples, other example value back-propagation strategies, such as maximum backup may not be desirable because the Monte-Carlo estimation may be too noisy when the number of simulations is low, which may misguide the algorithm, particularly at the beginning of search of the search tree. As compared to other example value back-propagation strategies, embodiments of systems and methods of the present application may include operations to exploit softmax backup for faster convergence rate of value estimation.

To illustrate embodiments of the present application, experiments may be conducted. As an example, a test domain may be a Synthetic Tree environment. A tree may have branching factor (number of actions) k of depth d. At each leaf of the tree, a standard Gaussian distribution may be assigned as an evaluation function. That is, each time a leaf is visited, the distribution may be used to sample a stochastic return. The mean of the Gaussian distribution may be determined. When initializing the environment, each edge of the tree may be assigned a random value and the mean of the Gaussian distribution at a leaf is the sum of values along the path from the root to the leaf. The environment may be similar to a P-game tree environment used to model two player minimax games. In the present example, the single (max) player version is considered. All means may be normalized in [0,1].

To illustrate embodiments of the present application, methods conducting operations associated with MENTS for five Atari games (e.g., BeamRider, Breakout, Q*bert, Seaquest, and SpaceInvaders) were tested. For the games, a vanilla Deep Q-network (DQN) was trained and used as an evaluation function for the tree search as discussed in the AlphaGo [12,13]. The softmax of Q-values may be used as the state value estimate, and the Boltzmann distribution over the Q-values may be used as the policy network to assign a probability prior to each action when expanding a node. A temperature may be set to 0.1. In illustrating experiments, the UCT algorithm adopts the tree-policy introduced in AlphaGo [13]:

$$PUCT(s, a) = Q(s, a) + cP(s, a)\frac{\sqrt{\Sigma_b N(s, b)}}{1 + N(s, a)}$$

where P(s, a) is the prior probability. Operations associated with MENTS may apply the same evaluation function. The prior probability is used to initialize the $Q_{sft}$ as described in some examples of the present application. The DQN may be trained using a hard-max target. Training a neural network using softmax targets such as soft Q-learning or PCL may be more suitable for operations associated with MENTS. In the illustrating experiments, DQN may be used in MENTS to present a useful comparison with UCT, as both sets of operations or algorithms may apply the same evaluation function.

Value Estimation in Synthetic Tree:

In embodiments of the present application, softmax values may advantageously be efficiently estimated and back-propagated in a data search tree structure. To verify these observations, the value estimation error of operations associated with MENTS and operations associated with UCT in both the bandit and tree search setting may be compared. For operations associated with MENTS, the error may be measured by the absolute difference between the estimated softmax value $V_{sft}(s_0)$ and the true softmax state value $V_{sft}^*(s_0)$ of the root $s_0$. For operations associated with UCT, the error may be measured by the absolute difference between the Monte Carlo value estimation $V(s_0)$ and the optimal state value $V^*(s_0)$ at the root.

Figure 2:
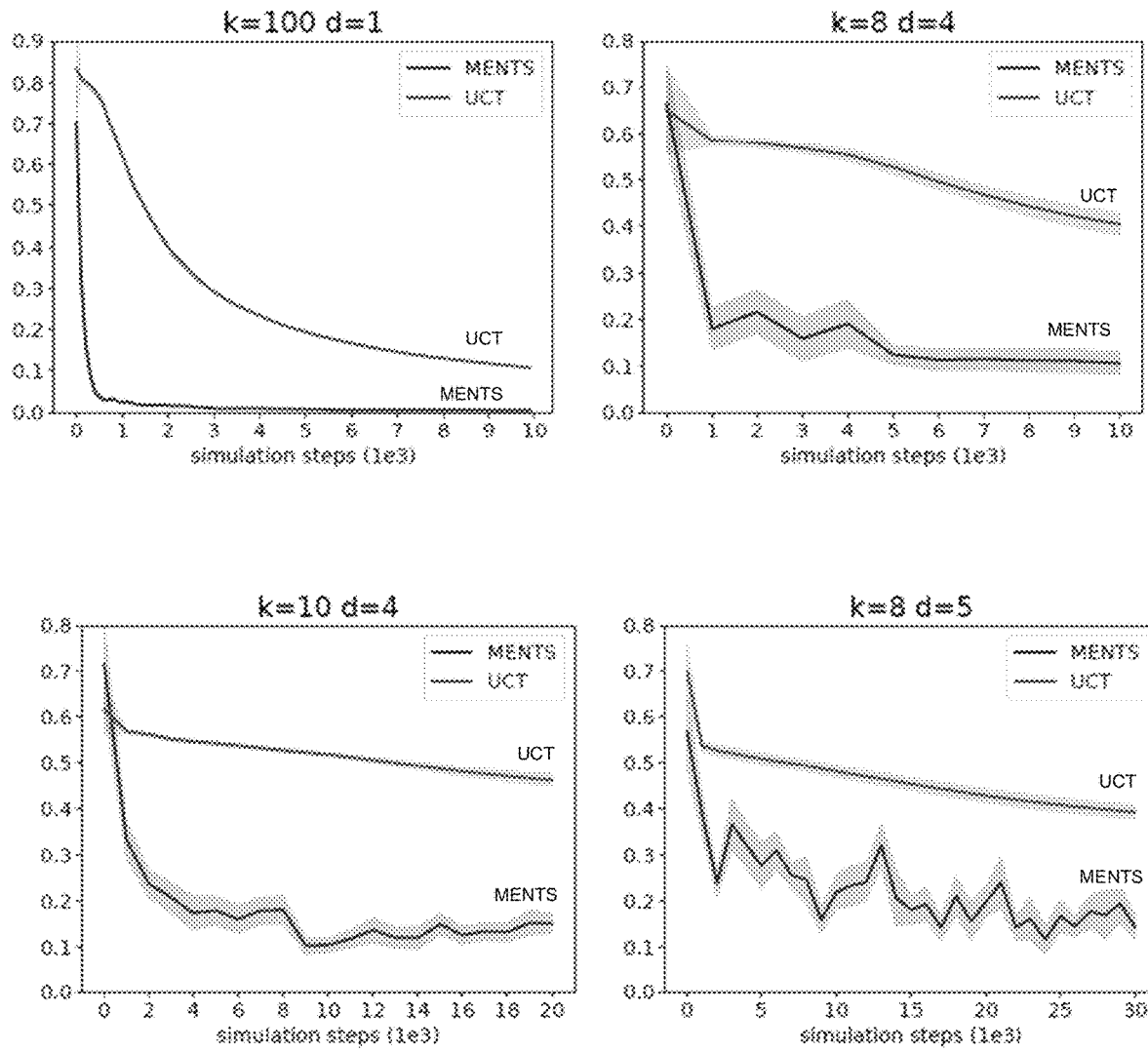
FIG. 2 illustrates graphical results of an evaluation of softmax value estimation in a synthetic tree environment, in accordance with an embodiment of the present application.

Reference is made to FIG. 2, which illustrates graphical results 200 of an evaluation of softmax value estimation in a synthetic tree environment, in accordance with an embodiment of the present application. In FIG. 2, the x-axis illustrates a number of simulations and the y-axis illustrates a value estimation error. A shaded area illustrates a standard error. In some scenarios, the softmax value may be efficiently estimated based on features of embodiments described herein.

In illustrating experiments, each data point can be averaged over 5×5 independent experiment (5 runs on 5 randomly initialized environment). In all of the test environments, observations illustrated that operations associated with MENTS estimates the softmax values efficiently. By comparison, observations illustrated that the Monte Carlo estimation used in operations associated with UCT converge more slowly to the optimal state value, even in the bandit setting (d=1).

Online Planning in Synthetic Tree:

A comparison of operations associated with MENTS and operations associated with UCT for online planning in a synthetic tree environment may be compared based on experiments. Both sets of operations may utilize Monte Carlo simulation with a uniform rollout policy as the evaluation function. The error may be evaluated by $V^*(s_0)-Q^*(s_0, a_t)$, where $a_t$ is the action proposed by the algorithm at simulation step t, and $s_0$ is the root of the synthetic tree. Optimal values $Q^*$ and $V^*$ may be computed by back-propagating the true values from the leaves when the environment is initialized.

Figure 3:
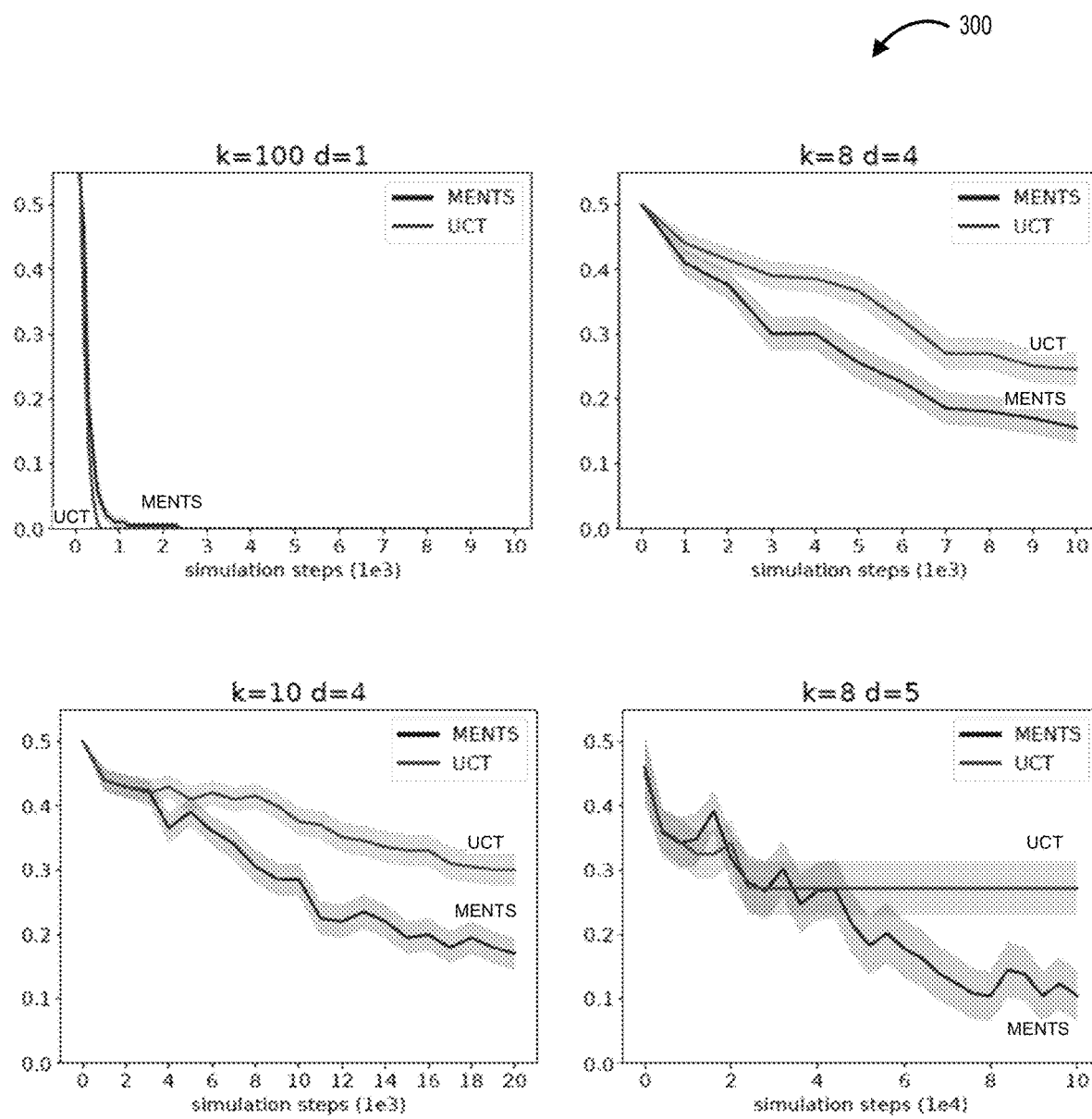
FIG. 3 illustrates graphical results of an evaluation of online planning in a synthetic tree environment, in accordance with an embodiment of the present application.

Reference is made to FIG. 3, which illustrates graphical results 300 of an evaluation of online planning in a synthetic tree environment, in accordance with an embodiment of the present application. In FIG. 3, the x-axis illustrates the number of simulations and the y-axis illustrates the planning error. The shaded area illustrates the standard area. From the illustration in FIG. 3, it may be observed that when conducting operations of MENTS described in the present application, there may be smaller errors as compared to when conducting operations associated with UCT. The contrast may be observed in larger domains.

As in the previous experiment described above, each data point can be averaged over 5×5 independent experiment (5 runs on 5 randomly initialized environment). Operations associated with UCT may converge faster than operations associated with MENTS in the bandit environment (d=1). This may be attributed to an advantage of operations associated with MENTS, being the usage of softmax state values, which can be efficiently estimated and back-propagated in the search tree. In the bandit case, such an advantage may not exist.

In the tree case (d>0), illustrating examples may show that operations associated with MENTS outperforms operations associated with UCT, especially in a large domain. For example, in synthetic tree with k=8 d=5, operations associated with UCT may fail to identify an optimal action at the root in some of the random environments, resulting in a large regret given the simulation budgets. However, operations associated with MENTS may continuously make progress towards the optimal solution in random environments, thereby illustrating that operations associated with MENTS may scale with larger tree depth.

In illustrating examples, operations associated with MENTS and operations associated with UCT may be compared based on running Atari games. In illustrating examples, each time step may utilize 500 simulations to generate a move. Results may be illustrated in Table 1 below:

TABLE 1

| Performance comparison of Atari games playing. | | | | | |
|---|---|---|---|---|---|
| Agent | BeamRider | Breakout | Q*bert | Seaquest | SpaceInvaders |
| DQN | 19280 | 345 | 14558 | 1142 | 625 |
| UCT | 21952 | 367 | 16010 | 1129 | 656 |
| MENTS | 18576 | 386 | 18336 | 1161 | 1503 |

Table 1 also illustrates results when operations associated with DQN were conducted. In the Atari games Breakout, Q*bert, and SpaceInvaders, the operations associated with MENTS outperforms operations associated UCT and the operations associated with DQN, as conducted by an agent. In the Atari games BeamRider and Seaquest, the operations of the agents performed similarly, as search algorithms may only use the DQN as the evaluation function and 500 simulations were applied to generate a move. It may be appreciated that there may be greater illustrated performance for operations associated with MENTS when larger simulation budgets are used.

Figure 4:
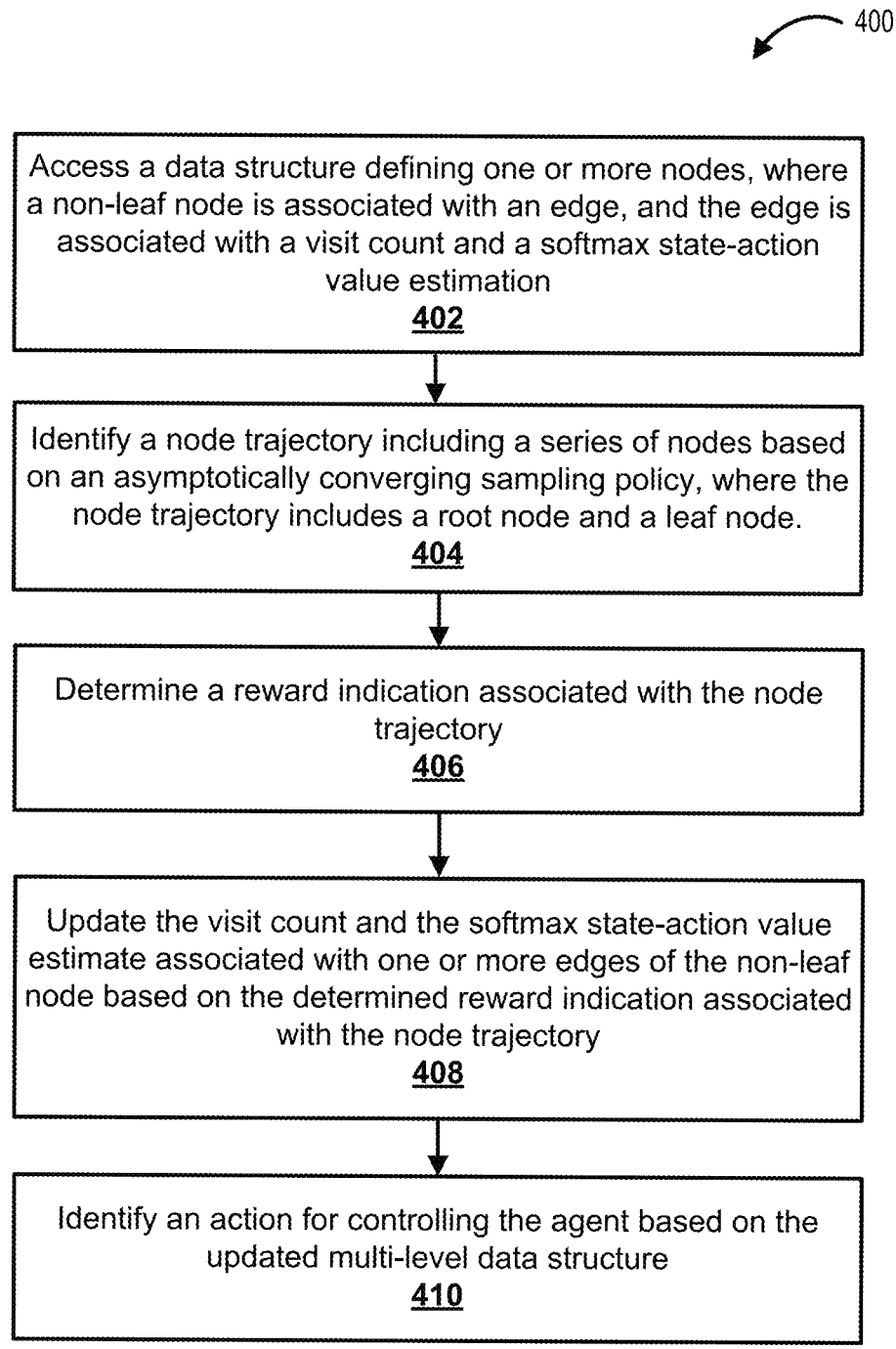
FIG. 4 illustrates a flowchart of a method of updating a multi-level data structure for controlling an agent, in accordance with embodiments of the present application.

Reference is made to FIG. 4, which illustrates a flowchart of a method 400 of updating a multi-level data structure for controlling an agent, in accordance with embodiments of the present application. The method 400 may be conducted by the processor 102 of the system 100 (FIG. 1). Processor-readable instructions may be stored in memory 106 and may be associated with the decision selection application 112 or other processor readable applications not illustrated in FIG. 1.

In some embodiments, the agent be a computing device or may be a control module within a computing device. In an example reinforcement learning system, the agent may interact with an environment and may receive reinforcement learning feedback from the environment. The multi-level data structure may be a representation of the agent interacting with or within the environment, and may be a structure for storing state data or for storing statistics associated with one or more nodes. The state data or statistics may be associated with basis for an agent to conduct actions or to predict a next state. In some examples, the state data or statistics may be used for identifying a probability of next successor states, given a current state and one or more actions taken by an agent.

In some embodiments, the multi-level data structure may store data associated with a plurality of nodes, and the plurality of nodes may respectively include data associated with edges. In some embodiments, the plurality of nodes may be associated with combinations or permutations of decision making paths for sequential actions. In some embodiments, the data associated with nodes and/or edges may be associated with statistics, such as visit count information, mean state values, softmax state-action value estimates, or similar data. Embodiments of methods described herein may conduct operations to identify or select subsequent nodes along a node trajectory represented by the data structure.

At operation 402, the processor may access a data structure defining one or more nodes. In some embodiments, the data structure may be stored in the data storage 114 (FIG. 1) of a system 100 and the processor, at operation 402, may retrieve an instance or copy of the data structure from memory or a network resource. For example, the data structure may be stored as a data set and may be loaded into random access memory or local memory of the system 100, such that the processor may read the data set or manipulate/update/expanding the data set.

In some embodiments, the processor, at operation 402, may be initializing a new data structure and, thus, may be allocating memory in the data storage 114 for the data structure.

In some embodiments, the data structure may be a data tree structure. In some embodiments, the processor may access the data tree structure such that tree search operations may be conducted. As an illustrating example, the processor may access the data tree structure for conducting operations associated with a Monte Carlo tree search.

The one or more nodes may include a root node, one or more leaf nodes, and/or one or more non-leaf nodes. A non-leaf node of the one or more nodes may be associated with one or more edges for traversing to a subsequent node. For example, in a data tree structure, an edge may define a traversal to a node to a subsequent node. The one or more edges may be associated with statistics, such as a visit count and a softmax state-action value estimate.

As a non-limiting example, the one or more nodes may be associated with a state of the agent and the one or more edges for traversing to a subsequent node may be associated with an action that the agent may select. To illustrate, in a tree data structure, a given node (e.g., a geographical position of an agent) may be associated with two edges (or branches), where each edge may be connected to a subsequent node. Each edge may be associated with a decision by the agent to move (e.g., move left or move right). The respective subsequent node may be a subsequent geographical position upon selecting to move left or to move right. In some embodiments, the visit count may be associated with a number of times that the movement has been selected, and the softmax-state-action value estimate may be associated with an outcome or a reward. Continuing with the present example, the outcome or the reward may be an indication of proximal distance the agent may be to a desired geographical position. The outcome may be associated with a particular action conducted by the agent or may be associated with a series of actions conducted by the agent.

In some embodiments, the softmax state-action value estimation may be based on a softmax function defined by:

$$\mathcal{F}_\tau(r) = \tau \log \Sigma_a \exp(r(a)/\tau)$$

where $\tau \geq 0$ is a user-specified temperature parameter controlling a degree of exploration, and r(a) is a reward for an action a.

In some embodiments, the processor may conduct one or more operations for updating the multi-level data structure for controlling the agent. In some embodiments, the one or more operations for updating the multi-level data structure may be conducted for each of a plurality of rounds. For example, the data structure may be associated with a reinforcement learning system, and the reinforcement learning system may be provided with a budget setting a set number of operations for updating the multi-level data structures. Accordingly, in some embodiments, a round may be associated with a simulation of a sequence of decisions, which may be associated with a sequence of nodes in the multi-level data structure.

At operation 404, the processor may identify a node trajectory including a series of nodes based on an asymptotically converging sampling policy. The node trajectory may include a root node and a leaf node of the data structure. In some embodiments, the asymptotically converging sampling policy may be associated with a mean squared error lower bound. Continuing with the above-described example, as a reinforcement learning system may be provided with a budget for updating the data structure, in some embodiments, the processor may determine a set of node trajectories based on the asymptotically converging sampling policy for optimizing the number of simulation outcomes that may most efficiently update the data structure.

In some embodiments, node trajectories including two or more nodes may be associated with a sequence of interrelated actions, where an outcome of the sequence of interrelated actions may be of significance or of interest to the agent. In some embodiments, the node trajectories may be associated with sequences of actions for updating the data structure, and the updated data structure may be analyzed for pre-emptive decision making or planning operations (e.g., optimizing utility delivery services to minimize transportation costs, optimizing public transit bus schedules to minimize passenger wait times, or the like).

In some embodiments, the asymptotically converging sampling policy may be based on a distribution defined by:)

$$\pi_t(a) = (1 - \lambda_s) f_\tau(\hat{r})(a) + \lambda_t \frac{1}{|\mathcal{A}|}$$

where $\lambda_t = \varepsilon \mathcal{A} / \log(t+1)$ is a decay rate for exploration and the exploration parameter is $\varepsilon > 0$.

At operation 406, the processor may determine a reward indication associated with the node trajectory. In some embodiments, determining the reward indication associated with the node trajectory may be based on a Monte Carlo evaluation simulating the node trajectory from the root node to the leaf node of the data structure.

In some embodiments, the reward indication may be an indication of an outcome associated with a given action or a series of actions. For example, in the example of actions representing movement to a subsequent position, the reward indication may be an indication of how close the agent may be to the desired geographical position.

In some embodiments, the processor may have previously generated the data structure and stored the data structure in the data storage 114. Thus, in some embodiments, the processor, may at operation 406 determine, based on at least the visit count and the softmax state-action value estimation associated with edges of the data structure, reward indications of one or more node trajectories.

For at least one non-leaf node in the node trajectory, the processor, at operation 408, may update the visit count and the softmax state-action value estimate associated with one or more edges of the non-leaf node based on the determined value estimation associated with the node trajectory. At operation 408, the processor updates the data structure, such that subsequent analysis or traversal of the data structure by the agent may assist the agent with identifying a subsequent node traversal or with identifying a node trajectory that may maximize a desired outcome or reward indication.

In some embodiments, updating the visit count and the softmax state-action value estimate associated with one or more edges of the non-leaf node may include operations defined by:

$$\hat{Q}_{sft}(s_t,a_t) \leftarrow \hat{V}_{sft}(s_{t+1})$$

$$\hat{V}_{sft}(s_t) \leftarrow \mathcal{F}_\tau(\hat{Q}_{sft}(s_t))$$

$$N(s_t,a_t) \leftarrow N(s_t,a_t)+1$$

where $\hat{Q}_{sft}(s_t)$ is a K dimensional vector, each component of which is $\hat{Q}_{sft}(s_t, a)$ for action a, and where $\mathcal{F}_\tau$ is a softmax function, and $N(s_t, a_t)$ is the state-action visit count.

In some embodiments, the accessed data structure (from operation 402) may have been generated by the processor using a policy or operations that may not rely on features of softmax state-action value estimation, described in some examples of the present application. Accordingly, in some embodiments, the processor, at operation 408, may be configured to back-propagate softmax values to update statistics (e.g., visit count, softmax values, or the like) based on features of embodiments of the present application to increase efficiency or effectiveness of sequential decision or selection problems.

At operation 410, the processor may identify an action for controlling the agent based on the updated multi-level data structure. In some embodiments, the processor may identify the action for controlling the agent based on statistics that may be stored in the one or more edges associated with a node. In some embodiments, the processor may identify an action based on two or more statistics associated with the one or more edges. For example, the processor may determine an action for reaching a subsequent node based on a weighted calculation of visit count, softmax state-action value estimation, and/or other statistics associated with the one or more edges.

In some embodiments, the processor may, for each of the plurality of rounds, determine an action for controlling the agent based on the maximum estimate softmax value at the root node $s_0$. For example, the action for controlling the agent may be defined by:

$$a_t = \operatorname{argmax}_a Q_{sft}(s_0, a)$$

In some embodiments, for the leaf node in the node trajectory, the processor may update statistics associated with the leaf node based on operations defined by:

$$N(s_L) \leftarrow |N(s_L)+1$$

$$\hat{V}(s_L) \leftarrow \hat{V}(s_L) + \frac{R - \hat{V}(s_L)}{N(s_L)},$$

where $N(s_L)$ may be a visit count associated with the leaf node, and where R may be the value estimation, and where $\hat{V}(s_L)$ may be the mean state value.

In some embodiments, the method may further include operations to expand the data structure. For example, the method may include operations to generate a further leaf node in the data structure. In some embodiments, the one or more edges associated with nodes of the data structure may include statistics, such as visit count and softmax state-action value estimation, that may be initialized with zero value. For example, the initialization of statistics may be defined by:

$$\forall a \in \mathcal{A} \ (s_L) N(s_L, a), \hat{Q}_{sft}(s_L, a) \leftarrow 0.$$

As described herein, embodiments of the present application may include operations for updating a multi-level data structure for controlling an agent based on evaluating statistics associated with a given node in a search tree based on softmax values back-propagated from simulations. In some examples, softmax values may be estimated at an optimal convergence rate in terms of mean square error. Further softmax values may be more efficiently back-propagated from simulations in a tree search, such that the probability of the operations described herein failing to identify the best decision at a given node may decay exponentially.

Figure 5:
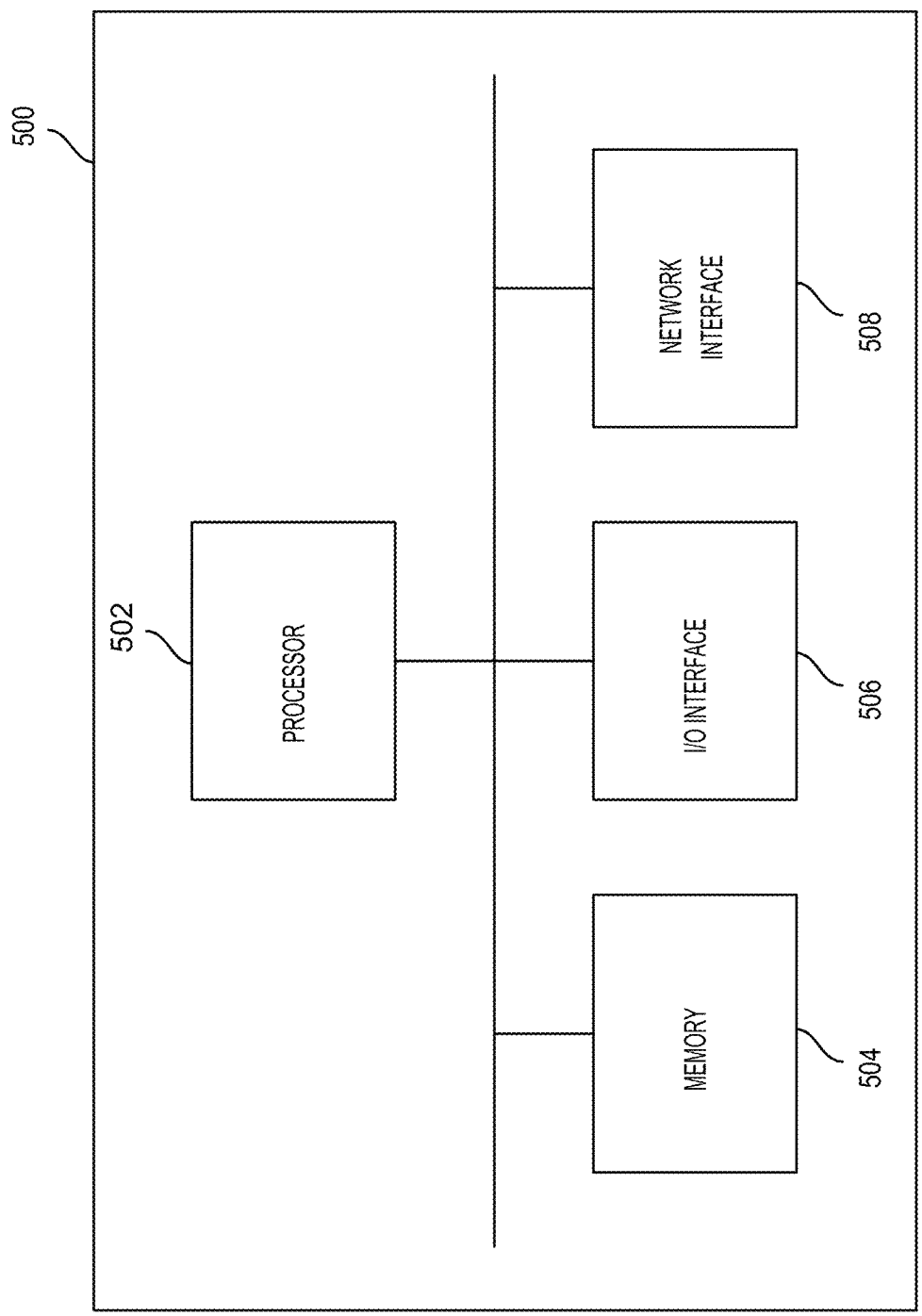
FIG. 5 illustrates a block diagram of a computing device, in accordance with an embodiment of the present application.

Reference is made to FIG. 5, which illustrates a block diagram of a computing device 500, in accordance with an embodiment of the present application. As an example, the system 100 or the client device 110 of FIG. 1 may be implemented using the example computing device 500 of FIG. 5.

The computing device 500 includes at least one processor 502, memory 504, at least one I/O interface 506, and at least one network communication interface 508.

The processor 502 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 504 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 506 may enable the computing device 500 to interconnect with one or more input devices, such as a keyboard, mouse, camera, touch screen and a microphone, or with one or more output devices such as a display screen and a speaker.

The networking interface 508 may be configured to receive and transmit data sets representative of the machine learning models, for example, to a target data storage or data structures. The target data storage or data structure may, in some embodiments, reside on a computing device or system such as a mobile device.

In some embodiments, there may be processor-executable instructions or software that, when executed, by a processor converts the computing device 500 into a special purpose computing device to perform particular operations pursuant to instructions of the processor-executable instructions.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

REFERENCES

[1] Tristan Cazenave. Sequential halving applied to trees. *IEEE Transactions on Computational Intelligence and AI in Games*, 7(1):102-105, 2015.

[2] Pierre-Arnaud Coquelin and Rémi Munos. Bandit algorithms for tree search. In *Uncertainty in Artificial Intelligence*, 2007.

[3] Rémi Coulom. Efficient selectivity and backup operators in monte-carlo tree search. In *International conference on computers and games*, pages 72-83. Springer, 2006.

[4] Tuomas Haarnoja, Haoran Tang, Pieter Abbeel, and Sergey Levine. Reinforcement learning with deep energy-based policies. *arXiv preprint arXiv:*1702.08165, 2017.

[5] Tuomas Haarnoja, Aurick Zhou, Pieter Abbeel, and Sergey Levine. Soft actor-critic: Off-policy maximum entropy deep reinforcement learning with a stochastic actor. *arXiv preprint arXiv:*1801.01290, 2018.

[6] Zohar Karnin, Tomer Koren, and Oren Somekh. Almost optimal exploration in multi-armed bandits. In *International Conference on Machine Learning*, pages 1238-1246, 2013.

[7] Michael Kearns, Yishay Mansour, and Andrew Y Ng. A sparse sampling algorithm for near-optimal planning in large markov decision processes. *Machine learning*, 49(2-3):193-208, 2002.

[8] Piyush Khandelwal, Elad Liebman, Scott Niekum, and Peter Stone. On the analysis of complex backup strategies in monte carlo tree search. In *International Conference on Machine Learning*, pages 1319-1328, 2016.

[9] Levente Kocsis and Csaba Szepesvári. Bandit based monte-carlo planning. In *European conference on machine learning*, pages 282-293. Springer, 2006.

[10] Tor Lattimore and Csaba Szepesvári. Bandit algorithms. 2018.

[11] Ofir Nachum, Mohammad Norouzi, Kelvin Xu, and Dale Schuurmans. Bridging the gap between value and policy based reinforcement learning. In *Advances in Neural Information Processing Systems*, pages 2775-2785, 2017.

[12] David Silver, Aja Huang, Chris J Maddison, Arthur Guez, Laurent Sifre, George Van Den Driessche, Julian Schrittwieser, Ioannis Antonoglou, Veda Panneershelvam, Marc Lanctot, et al. Mastering the game of go with deep neural networks and tree search. *nature*, 529(7587):484, 2016.

[13] David Silver, Julian Schrittwieser, Karen Simonyan, Ioannis Antonoglou, Aja Huang, Arthur Guez, Thomas Hubert, Lucas Baker, Matthew Lai, Adrian Bolton, et al. Mastering the game of go without human knowledge. *Nature*, 550(7676):354, 2017.

[14] Stephen J J Smith and Dana S Nau. An analysis of forward pruning. In *AAAI*, 1994.

[15] Richard S Sutton, Andrew G Barto, et al. *Introduction to reinforcement learning*, volume 135. MIT press Cambridge, 1998.

[16] David Tolpin and Solomon Eyal Shimony. Mcts based on simple regret. In *Twenty-Sixth AAAI Conference on Artificial Intelligence*, 2012.

[17] Chenjun Xiao, Jincheng Mei, and Martin Müller. Memory-augmented monte carlo tree search. In *Thirty-Second AAAI Conference on Artificial Intelligence*, 2018.

A. Proofs for Multi-Armed Bandits

We first introduce a Lemma that approximates the exponential function of empirical estimator using delta method [Bickel & Doksum (2015) Bickel and Doksum]. This Lemma will be used for both lower bound and upper bound analysis.

Lemma 3

Let $X_1, \ldots, X_n$ be i.i.d. random variables, such that $\mathbb{E}[X_i]=\mu$ and $\mathbb{V}[X_i]=\sigma^2<\infty$, $\overline{X}_n=\sum_{i=1}^n X_i/n$. The first two moment of $\exp(\overline{X}_n/\tau)$ could be approximated by, $$\mathbb{E}\left[\exp\left(\frac{\overline{X}_n}{\tau}\right)\right] = e^{\mu/\tau} + \frac{\sigma^2}{2n}\left(\frac{e^{\mu/\tau}}{\tau^2}\right) + R(n) \quad (5)$$

$$\mathbb{V}\left[\exp\left(\frac{\overline{X}_n}{\tau}\right)\right] = \frac{\sigma^2}{n}\left(\frac{e^{\mu/\tau}}{\tau}\right)^2 + R'(n) \quad (6)$$

where $|R(n)|<O(n^{-2})$, $|R'(n)|\leq O(n^{-2})$.

Proof:

By Taylor's expansion, $$\exp\left(\frac{\overline{X}_n}{\tau}\right) = e^{\mu/\tau} + \frac{e^{\mu/\tau}}{\tau^2}(\overline{X}_n - \mu) + \frac{e^{\mu/\tau}}{2\tau^2}(\overline{X}_n - \mu)^2 + \frac{e^{\xi/\tau}}{6\tau^3}(\overline{X}_n - \mu)^3$$

for some $\xi$ between $\mu$ and $\overline{X}_n$. Taking the expectation on both sides, $$\mathbb{E}\left[\exp\left(\frac{\overline{X}_n}{\tau}\right)\right] = e^{\mu/\tau} + 0 + \frac{e^{\mu/\tau}}{2\tau^2}\mathbb{V}[\overline{X}_n] + \frac{e^{\xi/\tau}}{6\tau^3}\mathbb{E}[(\overline{X}_n - \mu)^3].$$

Let $$R(n) = \frac{e^{\xi/\tau}}{6\tau^3}\mathbb{E}[(\overline{X}_n - \mu)^3].$$

By Lemma 5.3.1 of [Bickel & Doksum (2015) Bickel and Doksum], $|R(n)|\leq O(n^{-2})$, which gives Eq. (5).

Furthermore, note that $$\left(\mathbb{E}\left[\exp\left(\frac{\overline{X}_n}{\tau}\right)\right]\right)^2 = \left(e^{\mu/\tau} + \frac{\sigma^2}{2n}\left(\frac{e^{\mu/\tau}}{\tau^2}\right) + R(n)\right)^2$$

$$= e^{2\mu/\tau} + \frac{\sigma^2}{n}\left(\frac{e^{\mu/\tau}}{\tau}\right)^2 + \frac{C_1}{n^2} +$$

$$C_2 R(n) + C_3 \frac{R(n)}{n}$$

for some constant $C_1, C_2, C_3$. On the other hand, following the same idea of deriving Eq. (5), $$\mathbb{E}\left[\left(\exp\left(\frac{\overline{X}_n}{\tau}\right)\right)^2\right] = e^{2\mu/\tau} + \frac{2\sigma^2}{n}\left(\frac{e^{\mu/\tau}}{\tau}\right)^2 + \tilde{R}(n)$$

where $|\tilde{R}(n)|\leq O(n^{-2})$. The proof of Eq. (6) ends by taking the difference of the above two equations.

A.1 Proof of Theorem 1

We consider the learning problem in a Bayesian setting, and prove that $$\lim_{t\to\infty} \mathbb{E}\left[t(U-\hat{U}_t)^2 - \frac{\sigma^2}{\tau^2}\left(\sum_a \bar{\pi}(a)e^{r(a)/\tau}\right)^2\right] \geq 0,$$

where the expectation is taken on the randomness of the algorithm, the rewards $r_{1:K}$, and the observation $X_{k,i}$ given $r_{1:K}$. Thus the existence of $r_{1:K}$ is guaranteed since $r_{1:K}$ satisfies the property in expectation.

The benefit of considering the problem in a Bayesian setting is that the Bayes estimate of $U$, $\overline{U}_t$ for the squared loss $\mathbb{E}[(U-\hat{U}_t)^2]$ is the posterior mean, i.e. the conditional expectation of $U$ given the observations $X_{k,i}$. Such Bayes estimator can further be decomposed into the Bayes estimator of each arm, even without the assumption that $\hat{U}_t$ is decomposable or $\hat{U}_t$ has (asymptotic) unbiased estimator for each arm.

We still need some preparation before proving the main result. The following lemma shows that for an algorithm that performs well on all possible environments, it must pull each arm at least in an order of log(t) for t rounds.

Lemma 4

For any algorithm A such that $$\mathcal{E}_t = O\left(\frac{1}{t}\right),$$

it holds that $N_t(k)=\Omega(\log(t))$ for any arm k.

Unlike in the regret analysis for stochastic multi-armed bandits, where one only cares about how many times the suboptimal arms should be pulled, the log(t) lower bound on $N_t(k)$ for suboptimal arms is not strong enough to provides a tight lower bound of $\mathcal{E}$.

Proof:

We define the learning problem in the Bayesian setting, as follows. Assume that the reward of each arm $r_k$ is independently sampled from a Gaussian prior $\mathcal{N}(0, 1/\tau_0)$. At time step t, conditioned on the action $A_t$, we define the problem such that the reward $X_t$ at time step t is sampled from $\mathcal{N}(\tau_{A_t}, \sigma^2)$ independent to all the previous observations. Without loss of generality, we assume that $\sigma=1$ and $\tau=1$. We can also assume that $\bar{\pi}(a)=1$ for any a. To see why, note that $$\bar{\pi}(a)e^{r(a)} = e^{r(a) + \log(\bar{\pi}(a))}.$$

Thus, one can always define the surrogate reward function as $\check{r}(a) = r(a) + \log(\bar{\pi}(a))$ for any fixed $\bar{\pi}$.

By the tower rule and the fact that Bayes estimator is the minimizer of the mean squared error, $$\mathbb{E}[t(U - \hat{U}_t)^2] \geq \mathbb{E}[t(U - \tilde{U}_t)^2]$$
$$= \mathbb{E}[\mathbb{E}[t(U - \tilde{U}_t)^2 \mid r]],$$

where $\tilde{U}_t$ is the Bayesian estimator of U at time step t. It then suffices to prove that $$\lim_{t \to \infty} \mathbb{E}[t(U - \tilde{U}_t)^2 \mid r] \geq -\left(\sum_a e^{r(a)}\right)^2$$

for any r. The rest of the proof is always conditioned on r. Note that the Bayes estimator of U can be decomposed as $$\tilde{U}_t = \mathbb{E}[U \mid X_i, i=1, \ldots, K]$$
$$= \sum_j \mathbb{E}[\exp(r_j) \mid X_i, i=1, \ldots, K]$$
$$= \sum_j \mathbb{E}[\exp(r_j) \mid X_j].$$

Further noting that $\exp(X_{j,k})$ has a log-normal distribution with a Gaussian prior, its posterior distribution is still log-normal with the mean $$\exp\left(\frac{\sum_{k=1}^{N_t(j)} X_{j,k} + 1/2}{\tau_0 + N_t(j)}\right).$$

Therefore, the Bayesian estimator of U is $$\tilde{U}_t = \sum_j \exp\left(\frac{\sum_{k=1}^{N_t(j)} X_{j,k} + 1/2}{\tau_0 + N_t(j)}\right).$$

It remains to bound $(U - \tilde{U}_t)^2$ conditioned on r. Note that $$(U - \tilde{U}_t)^2 = \left(\sum_j \exp(r_j) - \exp\left(\frac{\sum_{k=1}^{N_t(j)} X_{j,k} + 1/2}{\tau_0 + N_t(j)}\right)\right)^2 = \sum_j \Delta_j^2 + \sum_{i \neq j} \Delta_j \Delta_i,$$

where $$\Delta_j = \exp(r_j) - \exp\left(\frac{\sum_{k=1}^{N_t(j)} X_{j,k} + 1/2}{\tau_0 + N_t(j)}\right).$$

Further Let $$\Phi_j = \frac{\sum_{k=1}^{N_t(j)} X_{j,k} + 1/2}{\tau_0 + N_t(j)} = \frac{N_t(j)}{\tau_0 + N_t(j)} \hat{r}_j + \frac{1/2}{\tau_0 + N_t(j)},$$

and $$\Gamma_j = \Phi_j - r_j = \frac{\sum_{k=1}^{N_t(j)} X_{j,k} + 1/2}{\tau_0 + N_t(j)} - r_j$$
$$= \frac{N_t(j)}{N_t(j) + \tau_0}(\hat{r}_j - r_j) + \frac{1/2 - \tau_0 r_j}{\tau_0 + N_t(j)}.$$

By Lemma 6, we have $$\mathbb{E}[\Delta_j \mid N_t(j), r] = O\left(\frac{1}{N_t(j)}\right)$$

and $$\mathbb{E}[\Delta_j^2 \mid N_t(j), r] = \exp(2r(j))\left(\frac{N_t(j)}{(N_t(j) + \tau_0)^2} + O\left(\frac{1}{N_t^2(j)}\right)\right).$$

Finally, define $P_t(j) = N_t(j)/t$ and let $\tau_0 \to 0$, $$\lim_{t \to \infty} t\mathbb{E}[(U - \tilde{U}_t)^2 \mid r] = \lim_{t \to \infty} t\mathbb{E}[\mathbb{E}[(U - \tilde{U}_t)^2 \mid N_t(1), \ldots, N_t(k), r]] =$$
$$\lim_{t \to \infty} \mathbb{E}\left[\sum_j \frac{\exp(2r(j)) + O\left(\frac{1}{N_t(j)}\right)}{P_t(j)}\right] \geq \left(\sum_a e^{r(a)}\right)^2$$

where the last inequality follows by Cauchy-Schwarz inequality and Lemma 4. Note that for the inequality to hold there must be for all action $k \in [K]$, $N_t(k) = N_t^*(k)$.

For the general case, where $\sigma, \tau \neq 1$, we can simply scale the reward by $\tau$, then the variance of $X_{j,k}$ is $$\frac{\sigma^2}{\tau^2}.$$

The proof still holds and we obtain the following inequality, $$\lim_{t \to \infty} t\mathbb{E}[(U - \tilde{U}_t)^2 \mid r] \geq \frac{\sigma^2}{\tau^2}\left(\sum_a \bar{\pi}(a) \exp(r(a)/\tau)\right)^2.$$

A.2 Concentration of $N_t(a)$ in Bandit

Define $\tilde{N}_t(k) = \Sigma_s \tau_s(k)$, where $\tau_s$ is the policy followed by REW at time step s. By Theorem 2.3 in [Wainwright (2015)] or [Wainwright (2017)], we have the following concentration result.

$$\mathbb{P}\big(|N_t(k) - \tilde{N}_t(k)| > \epsilon\big) \le 2\exp\left(-\frac{\epsilon^2}{2\sum_{s=1}^{t}\sigma_s^2}\right)$$

$$\le 2\exp\left(-\frac{2\epsilon^2}{t}\right),$$

where $\sigma_s^2 \le 1/4$ is the variance of Benoulli distribution with $p=\tau_s(k)$ at time step s. Denote the event $$\tilde{E}_\epsilon = \{\forall k \in [K], |\tilde{N}_t(k) - N_t(k)| < \epsilon\}.$$

Thus we have $$\mathbb{P}(\tilde{E}_\epsilon^c) \le 2K \exp\left(-\frac{2\epsilon^2}{t}\right).$$

It remains to bound $\mathbb{P}(|\tilde{N}_t(k) - N_t^*(k)| \ge \epsilon)$.

Lemma 5

Let $$\lambda_s = \frac{K}{\log(1+s)},$$

Algorithm 1 guarantees that, for $t \ge 4$.

$$\mathbb{P}\left(\|r - \hat{r}_t\|_\infty \ge \frac{2\sigma}{\log(2+t)}\right) \le 4K \exp\left(-\frac{t}{(\log(2+t))^3}\right)$$

Proof:
By the choice of $$\lambda_s = \frac{K}{\log(1+s)},$$

it follows that for all a and $t \ge 4$, $$\tilde{N}_t(a) = \sum_{s=1}^{t} \pi_s(a) \ge \sum_{s=1}^{t} \frac{1}{\log(1+s)}$$

$$\ge \sum_{s=1}^{t} \frac{1}{\log(1+s)} - \frac{s/(s+1)}{(\log(1+s))^2}$$

$$\ge \int_{1}^{1+t} \frac{1}{\log(1+s)} - \frac{s/(s+1)}{(\log(1+s))^2} ds$$

$$= \frac{1+t}{\log(2+t)} - \frac{1}{\log 2}$$

$$\ge \frac{t}{2\log(2+t)}$$

Conditioned on the event $\tilde{E}_\epsilon$ where we set $$\epsilon = \frac{t}{4\log(2+t)},$$

it follows that $$N_t(a) \ge \frac{t}{4\log(2+t)}.$$

Then, for any fixed k by the definition of sub-Gaussian, $$\mathbb{P}\left(|r(k) - \hat{r}_t(k)| > \sqrt{\frac{8\sigma^2 \log\left(\frac{2}{\delta}\right) \log(2+t)}{t}}\right) \le$$

$$\mathbb{P}\left(|r(k) - \hat{r}_t(k)| > \sqrt{\frac{2\sigma^2 \log\left(\frac{2}{\delta}\right)}{N_t(k)}}\right) \le \delta.$$

Let $\delta$ satisfy that $$\log(2/\delta) = \frac{t}{(\log(2+t))^3},$$

$$\mathbb{P}\left(|r(k) - \hat{r}_t(k)| > \frac{2\sigma}{\log(2+t)}\right) \le 2\exp\left(-\frac{t}{(\log(2+t))^3}\right)$$

Therefore for $t \ge 2$ $$\mathbb{P}\left(\|r_t - \hat{r}_t\|_\infty \ge \frac{2\sigma}{\log(2+t)}\right) \le \mathbb{P}\left(\|r_t - r_t\|_\infty \ge \frac{2\sigma}{\log(2+t)} \mid \tilde{E}_\epsilon\right) + \mathbb{P}(\tilde{E}_\epsilon^C) \le$$

$$\sum_k \mathbb{P}\left(|r(k) - \hat{r}_t(k)| > \frac{2\sigma}{\log(2+t)} \mid \tilde{E}_\epsilon\right) + \mathbb{P}(\tilde{E}_\epsilon^C) \le$$

$$2K \exp\left(-\frac{t}{(\log(2+t))^3}\right) + 2K \exp\left(-\frac{t}{2(\log(t+2))^2}\right) \le$$

$$4K \exp\left(-\frac{t}{(\log(2+t))^3}\right)$$

Theorem 6
Let $$\lambda_s = \frac{K}{\log(1+s)},$$

Algorithm 1 guarantees that, there exists some constant C only depending on K, $\tau$ and $\sigma$, such that, $$\mathbb{P}\left(|N_t(a) - N_t^*(a)| > \frac{Ct}{\log(2+t)}\right) \le O\left(Kt^2 \exp\left(-\frac{t}{(\log t)^3}\right)\right).$$

Proof:
We denote the event that $$\left\{\|r - \hat{r}_t\|_\infty < \frac{2\sigma}{\log(2+t)}\right\}$$

by $E_{r_t}$. Note that by the definition of $\pi_s(k)$, $$|\pi_s(k) - \pi^*(k)| \le |\hat{\pi}_s(k) - \pi^*(k)| + \lambda_s.$$

Thus, to bound $|\bar{N}_t(k)-N_t^*(k)|$, conditioned on the event $\cap_{i=1}^t E_{r_t}$ and for $t \geq 4$ there is, $$|\tilde{N}_t(k) - N_t^*(k)| \leq \sum_{s=1}^t |\hat{\pi}_s(k) - \pi^*(k)| + \sum_{s=1}^t \lambda_s$$

$$\leq \left(1 + \frac{1}{\tau}\right)\sum_{s=1}^t \|\hat{r}_s - r\|_\infty + \sum_{s=1}^t \lambda_s \quad \text{(by Lemma 7)}$$

$$\leq \left(1 + \frac{1}{\tau}\right)\sum_{s=1}^t \frac{2\sigma}{\log(2+s)} + \sum_{s=1}^t \lambda_s \quad \text{(by Lemma 5)}$$

$$\leq \left(1 + \frac{1}{\tau}\right)\int_{s=0}^t \frac{2\sigma}{\log(2+s)} ds + \int_{s=0}^t \frac{K}{\log(1+s)} ds$$

$$\leq \frac{Ct}{\log(2+t)}$$

for some constant C depending on K, $\sigma$ and $\tau$. Finally, $$\mathbb{P}\left(|\tilde{N}_t(k) - N_t^*(k)| \geq \frac{Ct}{\log(2+t)}\right) \leq \sum_{i=1}^t \mathbb{P}(\xi_{r_i}^c) =$$

$$\sum_{i=1}^t 4K \exp\left(-\frac{t}{(\log(2+t))^3}\right) \leq 4Kt \exp\left(-\frac{t}{(\log(2+t))^3}\right).$$

Therefore, $$\mathbb{P}\left(|N_t(k) - N_t^*(k)| \geq (1+C)\frac{t}{\log(2+t)}\right) \leq$$

$$\mathbb{P}\left(|\tilde{N}_t(k) - N_t^*(k)| \geq \frac{Ct}{\log(2+t)}\right) + \mathbb{P}\left(|N_t(k) - \tilde{N}_t(k)| > \frac{t}{\log(2+t)}\right) \leq$$

$$4Kt \exp\left(-\frac{t}{\log(2+t)^3}\right) + 2K \exp\left(-\frac{2t}{\log(2+t)^2}\right) \leq O\left(Kt^2 \exp\left(-\frac{t}{(\log t)^3}\right)\right)$$

A.3 Proof of Theorem 2

Proof:

[Proof of Theorem 2] Let $$\delta_t = t^{\frac{5}{6}}$$

with some constant C. Define the following set $$G_t = \{s | s \in 1:t, \lfloor N_t^*(a) + \delta_t \rfloor \geq s \geq \lfloor N_t^*(a) - \delta_t \rfloor\},$$

and its complementary set $G_t^c = \{1, 2, \ldots, t\} \setminus G_t$.

By Theorem 6, $\forall a \in \{1, \ldots, K\}$, with probability at least $1 - O(t \exp(-C_2 t^{1/3}))$, $N_t(a) \in G_t$. By law of total expectation and Lemma 3, $$\mathbb{E}\left[\exp\left(\frac{\hat{r}_t(a)}{\tau}\right)\right] = \sum_{s=1}^t \mathbb{P}(N_t(a) = s) \cdot \mathbb{E}\left[\exp\left(\frac{\hat{r}_t(a)}{\tau}\right) \bigg| N_t(a) = s\right] \quad (7)$$

$$= \sum_{s=1}^t \mathbb{P}(N_t(a) = s) \cdot \left(e^{r(a)/\tau} + \frac{\sigma^2}{2s}\left(\frac{e^{r(a)/\tau}}{\tau^2}\right) + O(s^{-\frac{3}{2}})\right)$$

-continued $$= e^{r(a)/\tau} + \sum_{s=1}^t \mathbb{P}(N_t(a) = s) \cdot \left(\frac{\sigma^2}{2s}\left(\frac{e^{r(a)/\tau}}{\tau^2}\right) + O(s^{-\frac{3}{2}})\right)$$

We divide the summation in two parts. For $s \in G_t^c$, by Theorem 6, $$\sum_{s \in G_t^c} \mathbb{P}(N_t(a) = s) \cdot \left(\frac{\sigma^2}{2s}\left(\frac{e^{r(a)/t}}{\tau^2}\right) + O(s^{-\frac{3}{2}})\right) \leq O\left(\frac{1}{t}\right) \quad (8)$$

For $s \in G_t$, $$\sum_{s \in G_t} \mathbb{P}(N_t(a) = s) \cdot \left(\frac{\sigma^2}{2s}\left(\frac{e^{r(a)/\tau}}{\tau^2}\right) + O(s^{-\frac{3}{2}})\right) \leq O((N_t^*(a) - \delta_t)^{-1}) \quad (9)$$

Combine the above together, $$\lim_{t \to \infty} t(U - \mathbb{E}[\hat{U}_t])^2 = \quad (10)$$

$$\lim_{t \to \infty} t\left(\sum_a \bar{\pi}(a)\left(\mathbb{E}\left[\exp\left(\frac{\hat{r}_t(a)}{\tau}\right)\right] - \exp\left(\frac{r_t(a)}{\tau}\right)\right)\right)^2 =$$

$$\lim_{t \to \infty} t\left(\sum_a \bar{\pi}(a)\left(O\left(\frac{1}{t}\right) + O((N_t^*(a) - \delta_t)^{-1})\right)\right)^2 = 0$$

To bound the variance, by the law of total variance, $$\mathbb{V}\left[\exp\left(\frac{\hat{r}_t(a)}{\tau}\right)\right] = \mathbb{E}\left[\mathbb{V}\left[\exp\left(\frac{\hat{r}_t(a)}{\tau}\right) \bigg| N_t(a)\right]\right] + \mathbb{V}\left[\mathbb{E}\left[\exp\left(\frac{\hat{r}_t(a)}{\tau}\right) \bigg| N_t(a)\right]\right] \quad (10)$$

Note that by Lemma 3, the first term is $$\mathbb{E}\left[\mathbb{V}\left[\exp\left(\frac{\hat{r}_t(a)}{\tau}\right) \bigg| N_t(a)\right]\right] = \sum_{s=1}^t \mathbb{P}(N_t(a) = s) \mathbb{V}\left[\exp\left(\frac{\hat{r}_t(a)}{\tau}\right) \bigg| N_t(a)\right] =$$

$$\sum_{s=1}^t \mathbb{P}(N_t(a) = s)\left(\frac{\sigma^2}{s}\left(\frac{e^{r(a)/\tau}}{\tau}\right)^2 + O(s^{-\frac{3}{2}})\right)$$

Using the same idea in Eq. (8) and Eq. (9), we consider the summation in two parts. For $s \in G_t^c$, $$\sum_{s \in G_t^c} \mathbb{P}(N_t(a) = s) \cdot \left(\frac{\sigma^2}{s}\left(\frac{e^{r(a)/\tau}}{\tau}\right)^2 + O(s^{-\frac{3}{2}})\right) \leq O\left(\frac{1}{t}\right)$$

For $s \in G_t$, $$\sum_{s \in G_t} \mathbb{P}(N_t(a) = s) \cdot \left(\frac{\sigma^2}{s}\left(\frac{e^{r(a)/\tau}}{\tau}\right)^2 + O(s^{-\frac{3}{2}})\right) \leq$$

$$\frac{\sigma^2}{\tau^2} \cdot \frac{e^{2r(a)/\tau}}{N_t^*(a) - \delta_t} + O\left((N_t^*(a) - \delta_t)^{-\frac{3}{2}}\right)$$

Put these together we have, $$\mathbb{E}\left[\mathbb{V}\left[\exp\left(\frac{\hat{r}_t(a)}{\tau}\right)\bigg| N_t(a)\right]\right] \leq \quad (11)$$

$$O\left(\frac{1}{t}\right) + \frac{\sigma^2}{\tau^2} \cdot \frac{e^{2r(a)/\tau}}{N_t^*(a) - \delta_t} + O\left((N_t^*(a) - \delta_t)^{-\frac{3}{2}}\right)$$

For the second term of Eq. (10) we have, $$\mathbb{V}\left[\mathbb{E}\left[\exp\left(\frac{\hat{r}_t(a)}{\tau}\right)\bigg| N_t(a)\right]\right] = \mathbb{E}\left[\left(\mathbb{E}\left[\exp\left(\frac{\hat{r}_t(a)}{\tau}\right)\bigg| N_t(a)\right]\right)^2\right] - \left(\mathbb{E}\left[\exp\left(\frac{\hat{r}_t(a)}{\tau}\right)\right]\right)^2$$

For the first term, by Lemma 3, $$\mathbb{E}\left[\left(\mathbb{E}\left[\exp\left(\frac{\hat{r}_t(a)}{\tau}\right)\bigg| N_t(a)\right]\right)^2\right] = \sum_{s=1}^{t} \mathbb{P}(N_t(a) = s)\left(\mathbb{E}\left[\exp\left(\frac{\hat{r}_t(a)}{\tau}\right)\bigg| N_t(a)\right]\right)^2 =$$

$$\sum_{s=1}^{t} \mathbb{P}(N_t(a) = s)\left(e^{2r(a)/\tau} + \frac{\sigma^2}{s}\left(\frac{e^{r(a)}}{\tau}\right)^2 + O(s^{-3/2})\right) \leq$$

$$e^{2r(a)/\tau} + O\left(\frac{1}{t}\right) + \frac{\sigma^2}{\tau^2} \cdot \frac{e^{2r(a)/\tau}}{N_t^*(a) - \delta_t} + O\left((N_t^*(a) - \delta_t)^{-\frac{3}{2}}\right)$$

where the last inequality follows by the same idea of proving Eq. (11). For the second term of Eq. (12), by Eq. (7), $$\left(\mathbb{E}\left[\exp\left(\frac{\hat{r}_t(a)}{\tau}\right)\right]\right)^2 \geq \exp\left(\frac{2r(a)}{\tau}\right)$$

Then we have, $$\mathbb{V}\left[\mathbb{E}\left[\exp\left(\frac{\hat{r}_t(a)}{\tau}\right)\bigg| N_t(a)\right]\right] \leq \quad (12)$$

$$O\left(\frac{1}{t}\right) + \frac{\sigma^2}{\tau^2} \cdot \frac{e^{2r(a)/\tau}}{N_t^*(a) - \delta_t} + O\left((N_t^*(a) - \delta_t)^{-\frac{3}{2}}\right)$$

Note that $$\lim_{t\to\infty} t \cdot \frac{\sigma^2}{\tau^2} \cdot \frac{e^{2r(a)/\tau}}{N_t^*(a) - \delta_t} = \quad (13)$$

$$\lim_{t\to\infty} \frac{\sigma^2}{\tau^2} \cdot \frac{e^{2r(a)/\tau}}{\pi*(a) - \frac{\delta_t}{t}} = \frac{\sigma^2}{\tau^2} \cdot \frac{e^{r(a)/\tau}}{\overline{\pi}(a)} \cdot \left(\sum_a \overline{\pi}(a)\exp(r(a)/\tau)\right)$$

Combine Eq. (11), Eq. (12) and Eq. (13) together, $$\lim_{t\to\infty} t\mathbb{V}[\hat{U}_t] = \lim_{t\to\infty} t\left(\sum_a \overline{\pi}^2(a)\mathbb{V}\left[\exp\left(\frac{\hat{r}_t(a)}{\tau}\right)\right]\right)$$

$$\leq \lim_{t\to\infty} t$$

$$\left(\sum_a \overline{\pi}^2(a)\left(O\left(\frac{1}{t}\right) + \frac{\sigma^2}{\tau^2} \cdot \frac{e^{2r(a)/\tau}}{N_t^*(a) - \delta_t} + O\left((N_t^*(a) - \delta_t)^{-\frac{3}{2}}\right)\right)\right)$$

$$= \frac{\sigma^2}{\tau^2}\left(\sum_a \overline{\pi}(a)\exp(r(a)/\tau)\right)^2$$

A.4 Technical Lemmas
Proof:

[Proof of Lemma 4] Consider two gaussian environments $v_1$ and $v_2$ with unit variance. The vector of means of the reward per arm in $v_1$ is $(r(1), \ldots, r(K))$ and $(r(1)+2\epsilon, r(2), \ldots, r(K))$ in $v_2$. Define $$U_1 = \sum_{i=1}^{K} e^{r_i}, U_2 = e^{r_1+2\epsilon} + \sum_{i=2}^{K} e^{r_i}$$

Let $\mathbb{P}_1$ and $\mathbb{P}_2$ be the distribution induced by $v_1$ and $v_2$ respectively. Denote the event, $$E = \{|\hat{U}_t - U_1| > e^{r_1}\epsilon\},$$

By definition, the error $\mathcal{E}_{t,v_1}$ under $v_1$ satisfies
$$\mathcal{E}_{t,v_1} \geq \mathbb{P}_1(E)\mathbb{E}[(U_1-\hat{U}_t)^2|E] \geq \mathbb{P}_1(E)e^{2r_1}\epsilon^2,$$

and the error $\mathcal{E}_{t,v_2}$ under $v_2$ satisfies
$$\mathcal{E}_{t,v_2} \geq \mathbb{P}_2(E^c)\mathbb{E}[(U_2-\hat{U}_t)^2|E^c] \geq \mathbb{P}_2(E^c)e^{2r_1}\epsilon^2.$$

Therefore, under the assumption that the algorithm suffers $O(1/t)$ error in both environments.

$$O\left(\frac{1}{t}\right) = \mathcal{E}_{t,P_1} + \mathcal{E}_{t,P_2} \geq \mathbb{P}_1(E)e^{2r_1}\epsilon^2 + \mathbb{P}_2(E^c)e^{2r_1}\epsilon^2$$

$$= e^{2r_1}\epsilon^2(\mathbb{P}_1(E) + \mathbb{P}_2(E^c)) \geq \frac{1}{2}e^{2r_1}\epsilon^2 e^{-2N_t(k)\epsilon^2}.$$

where the last inequality follows by Pinsker's inequality and Divergence decomposition Lemma [Lattimore & Szepesvári (2018) Lattimore and Szepesvári]. Thus, $$N_t(k) = \Omega(\log(t)).$$

Lemma 6
Let $$\Delta_j = \exp(r_j) - \exp\left(\frac{\sum_{k=1}^{N_t(j)} X_{j,k} + 1/2}{\tau_0 + N_t(j)}\right)$$

and $$\Gamma_j = \frac{N_t(j)}{N_t(j) + \tau_0}(\hat{r}_j - r_j) + \frac{1/2 - \tau_0 r_j}{\tau_0 + N_t(j)}.$$

$$\mathbb{E}[\Delta_j | N_t(j), r]$$
$$= e^{r_j} - \mathbb{E}[e^{\Phi_j} | N_t(j), r]$$
$$= e^{r_j}(1 - \mathbb{E}[e^{\Gamma_j} | N_t(j), r])$$
$$= O\left(\frac{1}{N_t(j)}\right)$$

and $$\mathbb{E}[\Delta_j^2 \mid N_t(j), r] = \exp(2r(j))\left(\frac{N_t(j)}{(N_t(j)+\sigma_0)^2} + O\left(\frac{1}{N_t^2(j)}\right)\right).$$

Proof:
By the fact that the variance of $X_{j,k}$ given r is 1, $$\mathbb{E}[\Gamma \mid N_t(j), r] = \frac{1/2 - \tau_0 r_j}{\tau_0 + N_t(j)}.$$

$$\mathbb{E}[\Gamma^2 \mid N_t(j), r] = \frac{N_t(j)}{(N_t(j)+\tau_0)^2} + O\left(\frac{1}{N_t^2(j)}\right).$$

Lemma 7
Given two soft indmax policies, $\pi^{(1)}=f_\tau(r^{(1)})$ and $\pi^{(2)}=f_\tau(r^{(2)})$, we have $$\|\pi^{(1)} - \pi^{(2)}\|_\infty \le \left(1 + \frac{1}{\tau}\right)\|r^{(1)} - r^{(2)}\|_\infty$$

Proof:
[Proof of Lemma 7] Note that $$\|\pi^{(1)} - \pi^{(2)}\|_\infty \le \|\log \pi^{(1)} - \log \pi^{(2)}\|_\infty \le$$
$$\frac{1}{\tau}\|r^{(1)} - r^{(2)}\|_\infty + |\mathcal{F}_\tau(r^{(1)}) - \mathcal{F}_\tau(r^{(2)})|$$

The proof ends by using the fact $|\mathcal{F}_\tau(r^{(1)}) - \mathcal{F}_\tau(r^{(2)})| \le \|r^{(1)} - r^{(2)}\|_\infty$, which follows Lemma 8 of [Nachum et al. (2017) Nachum, Norouzi, Xu, and Schuurmans].

B Proofs for Tree
This section contains the detailed proof for Theorem 4 and Theorem 5.

Proof: Theorem 4
We prove this using induction on the depth of tree.
Base Case:
For $s \in \mathcal{L}$, $$\mathbb{P}\big(|\hat{U}(s) - U(s)| \ge \epsilon U(s) \mid E\big) \le$$
$$\mathbb{P}\big(e^{\hat{V}(s)/\tau} \ge (1+\epsilon)e^{V(s)/\tau} \mid \xi_N\big) + \mathbb{P}\big(e^{\hat{V}(s)/\tau} \le (1-\epsilon)e^{V(s)/\tau} \mid E\big) =$$
$$\mathbb{P}\big(\hat{V}(s) \ge \tau\log(1+\epsilon) + V(s) \mid E\big) + \mathbb{P}\big(\hat{V}(s) \le \tau\log(1-\epsilon) + V(s) \mid E\big) \le$$
$$2\exp\left(-\frac{\epsilon^2 N_t(s)}{16\sigma^2}\right).$$

where the last inequality follows by the subgaussian assumption of $\hat{V}(s)$ on the leaf.
Induction:
For some internal node s, assume that the values of its children, $\{U(1), \ldots, U(K)\}$, can be estimated with the concentration property. We prove, $$\mathbb{P}\big(|\hat{U}(s) - U(s)| \ge \epsilon U(s)\big) \le \tilde{C}\exp\left(-\frac{\epsilon^2 t}{\tilde{C}\sigma^2}\right)$$

for some constant $\tilde{C}$. Note that by the definition of U, we have $\hat{U}(s)=\Sigma_k \hat{U}(k)$ and $U(s)=\Sigma_k U(k)$. For any $\alpha_i$ such that $\Sigma_k \alpha_k U(k) = \epsilon U(s)$, $$\mathbb{P}\big(|\hat{U}(s) - U(s)| \ge \epsilon U(s) \mid E\big) \le$$
$$\sum_k \mathbb{P}\big(|\hat{U}(k) - U(k)| \ge \alpha_k U(k) \mid E\big) \le \sum_k C \exp\left(-\frac{\alpha_k^2 \pi_k^* t}{2C\sigma^2}\right),$$

where the last inequality is by the induction hypothesis. Let $\alpha_k^2 \pi^*(k) = M$ where $$\sqrt{M} = \frac{\epsilon U(s)}{\Sigma_k U(k)/\sqrt{\pi^*(k)}}.$$

One can verify that $\Sigma_k \alpha_k U(k) = \epsilon U(s)$. Therefore, $$\mathbb{P}\big(|\hat{U}(s) - U(s)| \ge \epsilon U(s)\big) \le \sum_k C \exp\left(-\frac{\epsilon^2 t}{C\sigma^2}\left(\frac{U(s)}{\Sigma_k U(k)/\sqrt{\pi^*(k)}}\right)^2\right) \le$$
$$KC \exp\left(-\frac{\epsilon^2 t}{C\sigma^2}\frac{U(s)^2}{(\Sigma_k \sqrt{U(s)U(k)})^2}\right) \le KC \exp\left(-\frac{\epsilon^2 t}{C\sigma^2}\frac{U(s)}{2(\Sigma_k \sqrt{U(k)})^2}\right) \le$$
$$KC \exp\left(-\frac{1}{2K}\frac{\epsilon^2 t}{C\sigma^2}\right) \le \tilde{C}_1 \exp\left(-\frac{\epsilon^2 t}{\tilde{C}_2\sigma^2}\right).$$

Picking $\tilde{C}=\max\{\tilde{C}_1, \tilde{C}_2\}$ leads to the conclusion.

Proof: Theorem 5
Let $\{1, \ldots, K\}$ be the arms of the root $s_0$. Without of loss of generality, we assume that 1 is the arm with largest softmax value. The probability of SBT choosing a wrong arm at $s_0$ is, $$\mathbb{P}\big(\exists k \in [K], \hat{U}(k) > \hat{U}(1)\big) \le$$
$$\mathbb{P}\big(\exists k \in [K], \hat{U}(k) > \hat{U}(1) \mid E\big) + \mathbb{P}(E^c) \le \sum_k \mathbb{P}\big(\hat{U}(k) > \hat{U}(1) \mid E\big) + \mathbb{P}(E^c).$$

Since we have developed an upper bound on $\mathbb{P}(E^c)$, it remains to bound $\mathbb{P}(\hat{U}(k) > \hat{U}(1) \mid E)$. Note that $$\mathbb{P}\big(\hat{U}(k) > \hat{U}(1) \mid E\big) = \mathbb{P}\big(\hat{U}(k) - \hat{U}(1) - U(k) - U(1) > U(1) - U(k) \mid E\big) \le$$
$$\mathbb{P}\big(|\hat{U}(1) - U(1)| > \alpha_1 U(1) \mid E\big) + \mathbb{P}\big(|\hat{U}(k) - U(k)| > \alpha_k U(k) \mid E\big) \le$$
$$C \exp\left(-\frac{N_t^*(1)\alpha_1^2}{2C\sigma^2}\right) + C \exp\left(-\frac{N_t^*(k)\alpha_k^2}{2C\sigma^2}\right)$$

where $\alpha_k U(k) + \alpha_1 U(1) = U(1) - U(k)$. Picking $$\alpha = \frac{(U(1)-U(k))\sqrt{\pi^*(1)}}{\sqrt{\pi^*(1)}U(1) + \sqrt{\pi^*(k)}U(k)} \text{ and } \beta = \frac{(U(1)-U(k))\sqrt{\pi^*(1)}}{\sqrt{\pi^*(1)}U(1) + \sqrt{\pi^*(k)}U(k)},$$

we have $\mathbb{P}(\hat{U}(k)>\hat{U}(1))$ is upper bounded by $$2C \exp\left(-\frac{t}{2C\sigma^2} \frac{(\sqrt{U(1)} - \sqrt{U(k)})^2}{\Sigma_b U(b)}\right).$$

Finally, $$\mathbb{P}(\exists k \in [K], \hat{U}(k) > \hat{U}(1)) \le \sum_k (\hat{U}(k) > \hat{U}(1) \mid E) + \mathbb{P}(E^c) \le$$

$$2C \sum_k \exp\left(-\frac{t}{2C\sigma^2} \frac{(\sqrt{U_1} - \sqrt{U_k})^2}{\Sigma_b U_b}\right) + Ct^2 \exp\left(-\frac{t}{(\log t)^3}\right),$$

for some constant C not depending on t.

What is claimed is:

1. A method of updating a multi-level data structure for controlling an agent, the method comprising:
    accessing a data structure defining one or more nodes, wherein a non-leaf node of the one or more nodes is associated with one or more edges for traversing to a subsequent node, and wherein an edge of the one or more edges is associated with a visit count and a softmax state-action value estimation;
    for each of a plurality of rounds,
    identifying a node trajectory including a series of nodes based on an asymptotically converging sampling policy, wherein the node trajectory includes a root node and a leaf node of the data structure;
    determining a reward indication associated with the node trajectory; and
    for at least one non-leaf node in the node trajectory, updating the visit count and the softmax state-action value estimate associated with one or more edges of the non-leaf node based on the determined reward indication associated with the node trajectory; and
    for the leaf node in the node trajectory, updating statistics associated with the leaf node by;

$$N(s_L) \leftarrow N(s_L) + 1$$

$$\hat{V}(s_L) \leftarrow \hat{V}(s_L) + \frac{R - \hat{V}(s_L)}{N(s_L)}$$

wherein $N(s_L)$ is a visit count associated with the leaf node, and wherein R is the reward indication, and wherein $\hat{V}(s_L)$ is the mean state value.

2. The method of claim 1, comprising determining an action for controlling the agent based on the maximum softmax state-action value estimation at a given node.

3. The method of claim 1, wherein the asymptotically converging sampling policy is based on a distribution defined by:

$$\pi_t(a) = (1 - \lambda_t) f_\tau(\hat{r})(a) + \lambda_t \frac{1}{|\mathcal{A}|}$$

where $\lambda_t = \varepsilon |\mathcal{A}|/\log(t+1)$ is a decay rate for exploration and the exploration parameter is $\varepsilon > 0$.

4. The method of claim 1, wherein the asymptotically converging sampling policy is associated with a mean squared error lower bound.

5. The method of claim 1, wherein the softmax state-action value estimation is based on a softmax function defined by:

$$\mathcal{F}_\tau(r) = \tau \log \Sigma_a \exp(r(a)/\tau)$$

where $\tau \ge 0$ is a user-specified temperature parameter controlling a degree of exploration, and r(a) is a reward for an action a.

6. The method of claim 1, wherein updating the visit count and the softmax state-action value estimate associated with one or more edges of the non-leaf node includes:

$$\hat{Q}_{sft}(s_t, a_t) \leftarrow \hat{V}_{sft}(s_{t+1})$$

$$\hat{V}_{sft}(s_t) \leftarrow \mathcal{F}_\tau(\hat{Q}_{sft}(s_t))$$

$$N(s_t, a_t) \leftarrow N(s_t, a_t) + 1,$$

wherein $\hat{Q}_{sft}(s_t)$ is a K dimensional vector, each component of which is $\hat{Q}_{sft}(s_t, a)$ for action a, and wherein $\mathcal{F}_\tau$ is a softmax function, and $N(s_t, a_t)$ is the state-action visit count.

7. The method of claim 1, wherein determining a reward indication associated with the node trajectory is based on a Monte Carlo evaluation simulating the node trajectory from the root node to the leaf node of the data structure.

8. The method of claim 1, comprising expanding the data structure by generating a further leaf node in the data structure, and wherein for at least one edge associated with the data structure, initialize visit count and softmax state-action value estimation to zero as defined by:

$$\forall a \in \mathcal{A}(s_L) N(s_L, a), \hat{Q}_{sft}(s_L, a) \leftarrow 0$$

9. The method of claim 1, wherein the data structure is a tree data structure.

10. A system for updating a multi-level data structure for controlling an agent, the system comprising:
    a processor; and
    a memory coupled to the processor and storing processor-executable instructions that, when executed, configure the processor to:
        access a data structure defining one or more nodes, wherein a non-leaf node of the one or more nodes is associated with one or more edges for traversing to a subsequent node, and wherein an edge of the one or more edges is associated with a visit count and a softmax state-action value estimation;
    for each of a plurality of rounds,
        identify a node trajectory including a series of nodes based on an asymptotically converging sampling policy, wherein the node trajectory includes a root node and a leaf node of the data structure;
        determine a reward indication associated with the node trajectory; and
        for at least one non-leaf node in the node trajectory, update the visit count and the softmax state-action value estimate associated with one or more edges of the non-leaf node based on the determined reward indication associated with the node trajectory; and for the leaf node in the node trajectory, updating statistics associated with the leaf node by:

$$N(s_L) \leftarrow |N(s_L) + 1$$

$$\hat{V}(s_L) \leftarrow \hat{V}(s_L) + \frac{R - \hat{V}(s_L)}{N(s_L)}$$

wherein $N(s_L)$ is a visit count associated with the leaf node, and wherein R is the reward indication, and wherein $\hat{V}(s_L)$ the mean state value.

11. The system of claim 10, comprising processor-executable instructions that, when executed, configure the processor to determine an action for controlling the agent based on the maximum softmax state-action value estimation at a given node.

12. The system of claim 10, wherein the asymptotically converging sampling policy is based on a distribution defined by:

$$\pi_t(a) = (1 - \lambda_t) f_\tau(\hat{r})(a) + \lambda_t \frac{1}{|\mathcal{A}|}$$

where $\lambda_t = \varepsilon |\mathcal{A}|/\log(t+1)$ is a decay rate for exploration and the exploration parameter is $\varepsilon > 0$.

13. The system of claim 10, wherein the asymptotically converging sampling policy is associated with a mean squared error lower bound.

14. The system of claim 10, wherein the softmax state-action value estimation is based on a softmax function defined by:

$$\mathcal{F}_\tau(r) = \tau \log \Sigma_a \exp(r(a)/\tau)$$

where $\tau \geq 0$ is a user-specified temperature parameter controlling a degree of exploration, and r(a) is a reward for an action a.

15. The system of claim 10, wherein updating the visit count and the softmax state-action value estimate associated with the one or more edges of the non-leaf node includes:

$$\hat{Q}_{sft}(s_t, a_t) \leftarrow \hat{V}_{sft}(s_{t+1})$$

$$\hat{V}_{sft}(s_t) \leftarrow \mathcal{F}(\hat{Q}_{sft}(s_t))$$

$$N(s_t, a_t) \leftarrow N(s_t, a_t) + 1$$

wherein $\hat{Q}_{sft}(s_t)$ is a K dimensional vector, each component of which is $\hat{Q}_{sft}(s_t, a)$ for action a, and wherein $\mathcal{F}_\tau$ is a softmax function, and $N(s_t, a_t)$ is the state-action visit count.

16. The system of claim 10, wherein determining a reward indication associated with the node trajectory is based on a Monte Carlo evaluation simulating the node trajectory from the root node to the leaf node of the data structure.

17. A non-transitory computer-readable medium or media having stored thereon machine interpretable instructions which, when executed by a processor, cause the processor to perform a computer implemented method of updating a multi-level data structure for controlling an agent, the method comprising:

accessing a data structure defining one or more nodes, wherein a non-leaf node of the one or more nodes is associated with one or more edges for traversing to a subsequent node, and wherein an edge of the one or more edges is associated with a visit count and a softmax state-action value estimation;

for each of a plurality of rounds,
identifying a node trajectory including a series of nodes based on an asymptotically converging sampling policy, wherein the node trajectory includes a root node and a leaf node of the data structure;
determining a reward indication associated with the node trajectory; and
for at least one non-leaf node in the node trajectory, updating the visit count and the softmax state-action value estimate associated with one or more edges of the non-leaf node based on the determined reward indication associated with the node trajectory; and
for the leaf node in the node trajectory, updating statistics associated with the leaf node by:

$$N(s_L) \leftarrow N(s_L) + 1$$

$$\hat{V}(s_L) \leftarrow \hat{V}(s_L) + \frac{R - \hat{V}(s_L)}{N(s_L)}$$

wherein $N(s_L)$ is a visit count associated with the leaf node, and wherein R is the reward indication and wherein $\hat{V}(s_L)$ is the mean state value.

* * * * *